US012263571B2

(12) United States Patent
Wiker et al.

(10) Patent No.: US 12,263,571 B2
(45) Date of Patent: Apr. 1, 2025

(54) MACHINE TOOL AND METHOD FOR COOLING A DRIVE UNIT OF THE MACHINE TOOL

(71) Applicant: Robert Bosch GmbH, Stuttgart (DE)

(72) Inventors: Juergen Wiker, Stuttgart (DE); Daniel Barth, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 17/785,363

(22) PCT Filed: Nov. 26, 2020

(86) PCT No.: PCT/EP2020/083457
§ 371 (c)(1),
(2) Date: Jun. 14, 2022

(87) PCT Pub. No.: WO2021/136620
PCT Pub. Date: Jul. 8, 2021

(65) Prior Publication Data

US 2023/0001561 A1 Jan. 5, 2023

(30) Foreign Application Priority Data

Dec. 30, 2019 (DE) ..................... 10 2019 220 623.9
Nov. 25, 2020 (DE) ..................... 10 2020 214 817.1

(51) Int. Cl.
*B25F 5/00* (2006.01)
*B24B 23/02* (2006.01)
*B24B 55/02* (2006.01)

(52) U.S. Cl.
CPC ............ *B25F 5/008* (2013.01); *B24B 23/028* (2013.01); *B24B 55/02* (2013.01)

(58) Field of Classification Search
CPC ........ B25F 5/008; B24B 23/028; B24B 55/02
See application file for complete search history.

(56) References Cited

U.S. PATENT DOCUMENTS 3,740,932 A * 6/1973 Borsheim ............ F02M 35/022 55/DIG. 28
4,197,102 A * 4/1980 Decker .................. B01D 45/16 55/449

(Continued)

FOREIGN PATENT DOCUMENTS

CN 105033959 A 11/2015
DE 10 2007 017 243 A1 10/2008

(Continued)

OTHER PUBLICATIONS https://www.merriam-webster.com/dictionary/spiral Accessed Aug. 5, 2024.*

(Continued)

*Primary Examiner* — Burton S Mullins
(74) *Attorney, Agent, or Firm* — Maginot, Moore & Beck LLP

(57) ABSTRACT

A machine tool, in particular a hand-held machine tool, is disclosed. The machine tool includes at least one housing unit and at least one drive unit arranged within the housing unit. The machine tool further includes at least one separator unit which is provided to divide at least one fluid flow directed through the housing unit into at least two sub-flows, in particular according to a density of foreign bodies. One sub-flow of the sub-flows has a higher density of foreign bodies in comparison to another sub-flow of the sub-flows. The machine tool also includes at least one fluid cooling unit which is provided for cooling the drive unit by way of the at least two sub-flows.

20 Claims, 11 Drawing Sheets

(56) References Cited

U.S. PATENT DOCUMENTS

| | | | | |
|---|---|---|---|---|
| 6,406,505 | B1 * | 6/2002 | Oh | A47L 5/362 55/459.1 |
| 6,681,726 | B2 * | 1/2004 | Linsbauer | F02B 63/02 55/DIG. 28 |
| 7,323,023 | B2 * | 1/2008 | Michele | B04C 3/06 55/467 |
| 8,113,922 | B2 * | 2/2012 | Esenwein | B25F 5/02 451/449 |
| 8,348,727 | B2 * | 1/2013 | Trautner | B24B 41/007 451/344 |
| 8,808,432 | B2 * | 8/2014 | Rotter | B01D 46/2411 96/380 |
| 9,537,370 | B2 * | 1/2017 | Hess | B25F 5/02 |
| 2005/0196273 | A1 | 9/2005 | Nishikawa et al. | |
| 2007/0214756 | A1 * | 9/2007 | Lee | B01D 45/12 55/419 |
| 2011/0148227 | A1 * | 6/2011 | Schuele | B25F 5/008 310/50 |
| 2019/0305640 | A1 * | 10/2019 | Duernegger | H02K 9/06 |
| 2020/0099275 | A1 * | 3/2020 | Lv | H02K 9/26 |

FOREIGN PATENT DOCUMENTS

| | | | | |
|---|---|---|---|---|
| DE | 10 2008 041 370 | A1 | 2/2010 | |
| DE | 212013000108 | U1 * | 1/2015 | B23Q 11/127 |
| DE | 10 2018 107 808 | A1 | 10/2019 | |
| DE | 11 2018 000 849 | T5 | 10/2019 | |
| EP | 3 549 717 | A1 | 10/2019 | |
| JP | S58-49066 | A | 3/1983 | |
| JP | 2013049114 | A * | 3/2013 | B25F 5/00 |
| WO | 2007/007911 | A1 | 1/2007 | |
| WO | 2016/002542 | A1 | 1/2016 | |

OTHER PUBLICATIONS

English translation of DE 212013000108 (Year: 2014).*

International Search Report corresponding to PCT Application No. PCT/EP2020/083457, mailed Mar. 17, 2021 (German and English language document) (7 pages).

* cited by examiner

MACHINE TOOL AND METHOD FOR COOLING A DRIVE UNIT OF THE MACHINE TOOL

This application is a 35 U.S.C. § 371 National Stage Application of PCT/EP2020/083457, filed on Nov. 26, 2020, which claims the benefit of priority to (i) Serial No. DE 10 2019 220 623.9, filed on Dec. 30, 2019 in Germany, and (ii) Serial No. DE 10 2020 214 817.1, filed on Nov. 25, 2020 in Germany, the disclosures of which are incorporated herein by reference in their entirety.

BACKGROUND

There has already been proposed a power tool comprising at least one housing unit, comprising at least one drive unit arranged within the housing unit, and comprising at least one separating unit, the separating unit being designed to divide at least one fluid stream conducted through the housing unit into at least two sub-streams, one sub-stream of the sub-streams having a higher foreign body density in comparison with another sub-stream of the sub-streams.

SUMMARY

The disclosure is based a power tool, in particular a hand-held power tool, comprising at least one housing unit, comprising at least one drive unit arranged within the housing unit, and comprising at least one separating unit that is designed to divide at least one fluid stream conducted through the housing unit into at least two sub-streams, in particular in dependence on a foreign body density, wherein one sub-stream of the sub-streams has a higher foreign body density in comparison with another sub-stream of the sub-streams.

It is proposed that the power tool comprise at least one fluid cooling unit that is designed to cool the drive unit by means of the at least two sub-streams, in particular the sub-stream and the other sub-stream.

"Designed" is to be understood to mean, in particular, specially programmed, specially configured and/or specially equipped. That an object, in particular the fluid cooling unit, is designed for a particular function, in particular to cool the drive unit by means of the at least two sub-streams, is to be understood to mean, in particular, that the object fulfils and/or executes this particular function in at least one application state and/or operating state. Preferably, the fluid stream comprises a multiplicity of foreign bodies, in particular a number, a volume and/or a mass of foreign bodies per unit of volume, for example per $cm^3$, in the fluid stream indicating the foreign body density. In particular, the foreign bodies in the fluid stream and/or the sub-streams are in the form of dust particles, residues from a machined workpiece, in particular metal chips, impurities in the fluid stream or the like. In particular, the fluid stream and/or the sub-streams are/is composed at least partially, in particular at least largely, of air. Preferably, the fluid cooling unit comprises at least one intake opening, which in particular is delimited by the housing unit. In particular, the intake opening is arranged on a side of the housing unit that faces away from a working region of the power tool. Preferably, the fluid cooling unit comprises at least one outlet opening, which is at least partially delimited by the housing unit and preferably arranged at a distance from the intake opening. In particular, the sub-stream and/or the other sub-stream comprise/comprises a non-zero value for the foreign body density. Preferably, the fluid cooling unit is realized in such a manner that when the drive unit is cooled by means of the sub-streams, in particular the sub-stream and the further sub-stream, thermal energy is transferred from the drive unit to the sub-streams, in particular the sub-stream and/or the further sub-stream.

Preferably, the fluid cooling unit is designed to conduct the heat transferred to the sub-streams, in particular the sub-stream and/or the other sub-stream, out of the power tool, in particular the housing unit, via the sub-streams, in particular the sub-stream and/or the further sub-stream.

Preferably, the separating unit is realized in such a manner that a value of the foreign body density of the sub-stream is greater than a value of the foreign body density of the other sub-stream, in particular by at least 50%, preferably at least 70%, more preferably at least 80% and particularly preferably at least 90%, in particular the foreign bodies having a size, in particular a mean diameter, of at least 500 μm, preferably at least 100 μm and particularly preferably at least 20 μm. Preferably, the separating unit is designed to divide the fluid stream into the sub-stream and the other sub-stream by a geometric configuration of a guide section of the, in particular aspirated, fluid stream, in particular the sub-stream having a higher foreign body density in comparison with the other sub-stream. Preferably, the separating unit is designed to conduct the sub-stream and the other sub-stream, in particular from the guide section to the various guide sub-sections.

Preferably, the fluid cooling unit is designed to conduct the fluid stream via the intake opening, through at least one channel element, to the separating unit. In particular, the channel element is arranged at least substantially entirely within the housing unit.

"Substantially entirely" is to be understood to mean, in particular, an indication of a proportion of a component, in particular of the channel element, that has a particular property, in particular of being enclosed by the housing unit, in particular at least 90%, preferably at least 95% and particularly preferably at least 98% of a total volume and/or of a total mass of the component having the property. Preferably, the separating unit and the fluid cooling unit are realized as a single piece, in particular a channel element of the fluid cooling unit being designed to delimit the fluid stream on the guide section and/or the guide sub-sections. In particular, at least one separating element of the separating unit is realized as a channel element of the fluid cooling unit and delimits, in particular, at least one fluid channel for conducting the fluid. "As a single piece" is to be understood to mean, in particular, connected in a materially bonded manner such as, for example, by a welding process and/or an adhesive process and, particularly advantageously, formed-on, as by being produced from a casting and/or by being produced in a single or multi-component injection process. Preferably, the fluid cooling unit is designed to conduct the sub-streams, after flowing through the separating unit, at least partially in the direction of the drive unit, for the purpose of cooling the drive unit.

Preferably, the power tool is realized as a hand-held power tool. For example, the power tool is realized as an angle grinder, a drill, a vacuum cleaner, a screwdriver or the like. In particular, the drive unit is realized as a motor, in particular an electric motor. Preferably, the drive unit, the separating unit and/or the fluid cooling unit, in particular with the exception of the intake opening and/or the outlet opening, are/is arranged at least substantially entirely within the housing unit.

The design of the power tool according to the disclosure makes it possible to achieve advantageously effective cooling of the drive unit, in particular without fouling the drive unit, in particular because the sub-stream and the other sub-stream can be used to cool the drive unit.

An advantageously high energy efficiency can be achieved in cooling of the drive unit, in particular because an aspirated fluid stream can be used fully for cooling the drive unit.

It is furthermore proposed that the separating unit comprise at least one separating element, realized as a channel element, which is arranged in a proximity region of the drive unit and designed to divide the fluid stream. An advantageously effective cooling of the drive unit can be achieved by means of the sub-streams. An advantageously compact design becomes possible, as the sub-streams can be divided just before flowing past the drive unit. In particular, the separating element is designed to conduct the fluid stream on the guide section and to divide it into the sub-stream and the other sub-stream. Preferably, the separating element is realized as a passive element, in particular the separating element being designed to divide the fluid stream by a shape of the separating element, in particular as the fluid stream flows through it. In particular, the separating element is static, or immobile. Preferably, the separating element realizes at least one fluid inlet for conducting the fluid stream, and at least two fluid outlets for conducting the sub-stream and the other sub-stream, respectively. Preferably, the separating element has an at least partially curved basic shape in a sectional plane that comprises the guide section and/or at least one of the guide sub-sections. Preferably, the separating element is realized in such a manner that the guide section, in a region of the fluid inlet, has an angle of in particular at least 30°, preferably at least 60° and particularly preferably at least 80° to the guide sub-section of the other sub-stream in a region of one of the fluid outlets. Preferably, the separating element has at least one basic shape realized in such a manner that foreign bodies are conducted onto a path that deviates from a guide path of the fluid stream, in particular of the other sub-stream. In particular, the separating element is realized in such a manner that the sub-stream is guided at least partially separately from the other sub-stream. Preferably, the separating element is arranged on the fluid cooling unit, or is realized as part of the fluid cooling unit. Preferably, the separating element is arranged on the fluid cooling unit, or is realized as part of the fluid cooling unit.

Preferably, the separating unit, in particular the separating element, is realized fluidically between the intake opening and the drive unit. That "the separating element is arranged in a proximity region of the drive unit" is to be understood to mean, in particular, that the separating unit is arranged, in particular entirely, within a region around the drive unit that extends within a minimal distance of at most 150 mm, preferably at most 100 mm, and particularly preferably at most 50 mm around the drive unit. Preferably, the separating element arranged in the proximity region of the drive unit is arranged, in particular fastened, directly on the drive unit, in particular on a housing of the drive unit. It is conceivable for the separating element arranged in the proximity region of the drive unit to constitute a single piece with the drive unit, in particular the housing of the drive unit.

It is also proposed that the fluid cooling unit comprise at least one channel element, in particular the aforementioned, which is designed to guide the sub-stream, in particular separately from the other sub-stream, at least partially past an outer wall of the drive unit. Fouling of the drive unit with foreign bodies in the sub-stream can be advantageously prevented when the sub-streams are used to the drive unit. Unwanted abrasive damage to the drive unit, in particular to bearings and/or windings of the drive unit, can be advantageously prevented. An advantageously long service life becomes possible. In particular, the separating unit and/or the fluid cooling unit are/is realized in such a manner that the sub-stream, in particular in a region along the drive unit, is conducted, at least largely separately from the other sub-stream, through the housing unit. Preferably, the fluid cooling unit is designed to conduct the other sub-stream into, or through, the drive unit for the purpose of cooling the drive unit. In particular, the channel element is arranged outside of the drive unit, on the outer wall. Particularly preferably, the channel element is arranged directly on the drive unit, in particular on the outer wall. In particular, the channel element bears flatly against the outer wall. Particularly preferably, the channel element is designed to transfer heat from the drive unit, in particular the outer wall, to the sub-stream, in particular cooling of the drive unit being effected by the sub-stream.

Preferably, the channel element extends along an entire length of the drive unit, on the outer wall. Preferably, the channel element is made, at least partially, in particular at least largely, of a thermally conductive material that, in particular, has a thermal conductivity of, in particular, at least 10 W/(m·K), preferably at least 40 W/(m·K), more preferably at least 100 W/(m·K) and particularly preferably at least 200 W/(m·K). Preferably, the channel element is at least substantially rectilinear, in particular along an entire length of the outer wall. In particular, the channel element is at least substantially parallel to the outer wall, in particular an outer surface of the outer wall, that faces toward the channel element, or that bears at least partially against the channel element. "Substantially parallel" is to be understood here to mean, in particular, an alignment of a direction, in particular a direction of main extent of the channel element, relative to a reference direction, in particular a direction of main extent of the outer wall and/or of the outer surface of the outer wall, the direction deviating from the reference direction, in particular as viewed in at least one plane of projection, by in particular less than 8°, advantageously less than 5°, and particularly advantageously less than 2°. A "direction of main extent" of an object, in particular of the outer wall and/or of the outer surface of the outer wall, is in this case to be understood to mean, in particular, a direction that is parallel to a longest edge of a smallest geometric cuboid that only just completely encloses the object.

It is further proposed that the separating unit comprise at least one conveying unit, which is arranged within the fluid cooling unit and is designed to convey at least the sub-stream out of or through the housing unit. Advantageously effective cooling can be achieved, in particular because high flow rates of the fluid streams, in particular of the sub-streams, become possible by means the conveyor unit. Distribution of foreign bodies from the sub-stream within the housing unit, the separator unit and/or the fluid cooling unit, in particular into the other sub-stream, can be advantageously prevented. In particular, the conveying unit is realized as a flow pump. Preferably, the conveying unit is designed to draw in the sub-stream via the fluid cooling unit, in particular through the intake opening. Preferably, the conveying unit is designed to convey the fluid stream, in particular along the guide section, through the separating unit and to divide it, in particular by means of a conveying speed and the separating element, into the sub-streams, in particular the sub-stream and the other sub-stream. Preferably, the conveying unit is designed to convey the sub-streams, in particular the sub-stream and the other sub-stream, in particular after cooling of the drive unit, through the outlet openings out of the power tool, in particular out of the housing unit. Preferably, the conveying unit comprises at least one conveying element that is realized, for example as a fan impeller, as a blade, as a piston or the like. Preferably, the conveying element is arranged at least partially, in particular at least largely, within the fluid cooling unit, in particular within a channel element of the fluid cooling unit. Preferably, the conveying element is arranged behind the drive unit, as viewed from the intake opening. In particular, the conveying element constitutes a single piece with a fan of the drive unit. Alternatively or additionally, it is conceivable for the conveying element to be arranged between the separating unit and the drive unit or, as viewed from the intake opening, in front of the separating unit. Particularly preferably, the conveying unit, in particular the conveying element, is designed to convey the sub-stream and the other sub-stream through the fluid cooling unit, through the separating unit and/or out of the power tool, or the housing unit.

It is also proposed that the conveying unit comprise at least one conveying element, which is realized as an axial fan. An advantageously simple and inexpensive design of the conveying unit can be achieved. Advantageously, a fan impeller of the drive unit can be used as a conveying element for the sub-streams. It is conceivable for the conveying element realized as an axial fan to be realized as part of the drive unit. Preferably, the conveying element constitutes a single piece with a fan impeller of the drive unit. Preferably, the conveying element is arranged fluidically behind the drive unit, as viewed from the intake opening.

Alternatively, it is conceivable for the conveying element to be arranged in a channel element of the fluid cooling unit that is designed to conduct the sub-stream. In the alternative design, the conveying element is preferably arranged fluidically behind the separating unit, as viewed from the intake opening. In particular, the conveying element is arranged within the guide sub-section of the sub-stream.

It is further proposed that the conveying unit be designed to convey the sub-stream and the other sub-stream separately from each other through the housing unit and/or the fluid cooling unit. Fouling of the drive unit with foreign bodies in the sub-stream can be advantageously prevented when the sub-streams are used to the drive unit. Advantageously effective separation of the sub-streams becomes possible. Preferably, the conveying unit, in particular together with the fluid cooling unit, is designed to convey the sub-streams each in different directions. Preferably, the conveying element of the conveying unit is realized, in at least one region of the conveying element, as a radial fan. Preferably, the conveying element is realized, in at least one further region of the conveying element, as an axial fan. Preferably, the region of the conveying element, as viewed along a drive axis of the conveying element, is surrounded by the further region. Preferably, the region of the conveying element is at a lesser minimum radial distance from the drive axis of the conveying element than the further region of the conveying element. For example, the conveying element is realized as a fan impeller, in particular a two-part fan impeller. Particularly preferably, the conveying element is arranged, in particular fluidically, behind the drive unit, preferably as viewed from the intake opening. In particular, the conveying element is realized as part of the drive unit. Preferably, the conveying element is designed to convey the sub-stream, in particular in a proximity region around the conveying element, in a direction oriented at least substantially parallel to the drive axis of the conveying element. Preferably, the conveying element is designed to convey the other sub-stream, in particular in a proximity region of the conveying element, in a direction oriented at least substantially perpendicularly to the drive axis of the conveying element. “Substantially perpendicularly” is to be understood to mean, in particular, an orientation of a direction, in particular a direction of conveyance of the other sub-stream, relative to a reference direction, in particular a direction along the drive axis of the conveying element, the direction and the reference direction, in particular as viewed in a plane of projection, enclosing an angle of 90°, and the angle having a maximum deviation of in particular less than 8°, advantageously less than 5° and particularly advantageously less than 2°. Preferably, the conveying unit is designed to convey the sub-stream and the other sub-stream out of the power tool, or the housing unit, each through differently realized and/or spaced outlet openings of the fluid cooling unit.

It is furthermore proposed that the separating unit comprise at least one separating element, in particular a further separating element, that is arranged within a channel element, in particular a further channel element, in particular a main channel element, of the fluid cooling unit, and that is designed to conduct the fluid stream onto a circular path, for the purpose of dividing the sub-streams, as viewed along the channel element, in particular the further channel element. An advantageously compact design of the separating unit becomes possible, in particular since the further separating element can be arranged in the further channel element. It becomes possible to achieve advantageously little settling of foreign bodies, in particular because the further channel element can be realized with a flat inner wall. Preferably, the further separating element is arranged at least substantially entirely within the further channel element, in particular the main channel element. Preferably, the further channel element, in particular the main channel element, is realized in the form of a tube and/or hollow cylinder, and in particular has at least one central axis. In particular, the central axis of the further channel element, in particular of the main channel element, is at least substantially parallel to, in particular coaxial with, the drive axis, a longitudinal axis of the power tool, an axis of main extent of the fluid cooling unit and/or of the power tool and/or a direction of propagation of the fluid stream within the fluid cooling unit. In particular, the further channel element, in particular of the main channel element, is arranged, in particular fluidically, between the intake opening and the drive unit. Particularly preferably, the conveying unit, in particular the conveying element, is designed to convey the fluid stream from the intake opening through the further channel element, in particular the main channel element, the fluid stream being conducted by means of the further separating element, as viewed along the further channel element and/or the central axis of the further channel element, onto the circular path. In particular, the fluid stream, as it flows through the further channel element and the further separating element, in particular on the circular path, is divided into the sub-stream and the other sub-stream, in particular the sub-stream being conducted through the further channel element onto a path that, in particular due to inertia, has a larger radius with respect to the central axis than a path of the other sub-stream through the further channel element. Preferably, foreign bodies in the sub-stream have a path that, with respect a central axis of the further channel element, have a larger radius than a path of the other sub-stream. Preferably, the separating element realized as a channel element is realized at least partially in the shape of a funnel and/or trumpet. In particular, the separating element realized as a channel element is arranged behind the further separating, as viewed from the intake opening. Preferably, the separating element is at least partially cone-shaped. Preferably, the separating element delimits at least one passage, around the central axis of the separating element, that is designed in particular to conduct the other sub-stream. Preferably, the separating element is designed to separate the sub-stream conducted by means of the further separating element onto the circular path from the other sub-stream, in particular the sub-stream being conducted, along an outer wall of the separating element, into the channel element, and in particular the other sub-stream being conducted, through the passage of the separating element, onto and/or into the drive unit.

It is furthermore proposed that the separating element, in particular the aforementioned, be realized as a helical and/or spiral shaped part. Advantageously simple and inexpensive separation of the fluid stream into the sub-streams can be achieved. An advantageously compact design of the power tool, in particular of the fluid cooling unit and the separating unit, becomes possible, in particular since the fluid stream can be divided within a straight fluid channel. It can be achieved that there is advantageously little wear on the fluid cooling unit and the separator unit, in particular on the inner walls, in particular because foreign bodies have a shallower angle to the inner walls of the fluid channels when the fluid stream is divided. It is thus also possible to achieve advantageously low levels of residues due to foreign bodies within the fluid cooling unit. Preferably, the further separating element delimits, in particular within and/or together with the main channel element, in particular the main channel element, a fluid guiding channel that extends, from the intake opening in the direction of the drive unit, along a curve that runs with a constant gradient around a lateral surface of an imaginary cylinder. Preferably, the further separating element is realized as a single-thread screw. Alternatively, it is conceivable for the further separating element to be realized as a two-thread, three-thread or multi-thread screw. Particularly preferably, the further separating element has a central axis around which in particular the fluid guiding channel is wound. Particularly preferably, the central axis of the further separating element is oriented coaxially with a central axis of the further channel element, in particular of the main channel element, and/or with the central axis of the separating element, around which in particular the passage of the separating element is realized. It is conceivable for the conveying unit to comprise at least one, in particular a further, conveying element, which is arranged, in particular fluidically, between the intake opening of the fluid cooling unit and the drive unit. Preferably, the conveying element is arranged at least partially, in particular at least largely, within the fluid cooling unit, in particular within a channel element of the fluid cooling unit. It is conceivable for the conveying element arranged between the intake opening and the drive unit to be arranged between the separating unit and the drive unit, or between the intake opening and the separating unit. In particular, the conveying element arranged between the intake opening and the drive unit is designed to convey the sub-stream and/or the other sub-stream through the fluid cooling unit, through the separating unit and/or out of the power tool, or the housing unit. Alternatively or additionally, it is conceivable for the conveying unit to comprise at least one, in particular the aforementioned or a further, conveying element, which is realized as a spiral wheel. Preferably, the conveying element realized as a spiral wheel is realized as part of the separation unit. In particular, the conveying element realized as a spiral wheel is designed to divide the fluid stream into the sub-streams, in particular the sub-stream being at a greater radial distance from the drive axis than the other sub-stream. Preferably, a separating element of the separating unit and/or the fluid cooling unit are/is realized in such a manner that the sub-stream and the other sub-stream are conducted separately from one another after exiting the conveying element realized as a spiral wheel, or a conveying region of the conveying element realized as a spiral wheel. For example, the separating element is realized as a funnel, in particular the other sub-stream being conducted along a central axis of the funnel that in particular is coaxial with the drive axis of the conveying element, and the sub-stream being guided along an outer wall of the separating element.

It is also proposed that the separating unit and/or the fluid cooling unit comprise at least one filter element that is designed to alter, in particular to reduce, the foreign body density of the fluid stream. It becomes possible to achieve an advantageously low foreign body density of the fluid stream, in particular even before it is divided into the sub-streams. It becomes possible to achieve an advantageously low foreign body density of the sub-stream used to cool the drive unit. It becomes possible to achieve an advantageously low degree of fouling, or deposition of foreign bodies, within the housing unit, the separating unit and/or the fluid cooling unit. In particular, the filter element is arranged, in particular directly, at the intake opening of the fluid cooling unit. Preferably, the filter element, in particular a filter surface of the filter element, is arranged at least partially transversely or at least substantially perpendicularly to a direction of flow of the fluid stream. Preferably, the filter surface spans, with the direction of flow of the fluid stream, in a region of the filter element, or of the intake opening, an angle having a value from a value range of, in particular, 8° to 82°, preferably 10° to 50° and particularly preferably 15° to 30°. In a preferred design, the filter element is at least partially, in particular at least largely, cone-shaped.

It is further proposed that the fluid cooling unit comprise at least one main channel element, in particular the aforementioned, for conducting the fluid stream, which is arranged in front of the drive unit as viewed along a direction of main extent of the fluid cooling unit, wherein the conveying element is arranged within the main channel element and/or within a region of the fluid cooling unit delimited by the main channel element. An advantageously simple and inexpensive design becomes possible, in particular since the conveying unit in the main channel element can be used centrally for conveying the entire fluid stream, and/or since all components influencing the fluid stream, such as, for example, the filter element and/or the separator unit, can be advantageously realized as a single piece. It becomes possible to achieve advantageously effective cooling of the drive unit and/or of the other components of the power tool that are arranged in front of the drive unit, on the main channel element, as viewed along the direction of main extent of the fluid cooling unit. In particular, the fluid cooling unit comprises, along the direction of main extent of the fluid cooling unit, in a region of the main channel element, only exactly one guide section that is arranged in particular within the main channel element. Preferably, the direction of main extent of the fluid cooling unit is oriented at least substantially parallel to a direction of main extent of the drive unit and/or of the housing unit and to the drive axis of the conveying element. Particularly preferably, the main channel element extends from the intake opening, in particular along the direction of main extent of the fluid cooling unit, to the separating unit.

Also proposed is a process for cooling at least one drive unit of a power tool according to the disclosure.

The design of the process according to the disclosure makes it possible to achieve advantageously effective cooling of the drive unit, in particular without fouling the drive unit, in particular because the sub-stream and the other sub-stream can be used to cool the drive unit. An advantageously high energy efficiency can be achieved in cooling of the drive unit, in particular because an aspirated fluid stream can be used fully for cooling the drive unit. An advantageously long service life becomes possible.

The power tool according to the disclosure and/or the process according to the disclosure are/is not intended in this case to be limited to the application and embodiment described above. In particular, the power tool according to the disclosure and/or the process according to the disclosure may have a number of individual elements, components and units that differs from a number stated herein, in order to fulfill an operating principle described herein. Moreover, in the case of the value ranges specified in this disclosure, values lying within the stated limits are also to be deemed as disclosed and applicable in any manner.

BRIEF DESCRIPTION OF THE DRAWINGS

Further advantages are given by the following description of the drawings. Six exemplary embodiments of the disclosure are represented in the drawings. The drawings, the description and the claims contain numerous features in combination. Persons skilled in the art will also expediently consider the features individually and combine them to create appropriate further combinations.

In the drawings.

DETAILED DESCRIPTION

Figure 1:
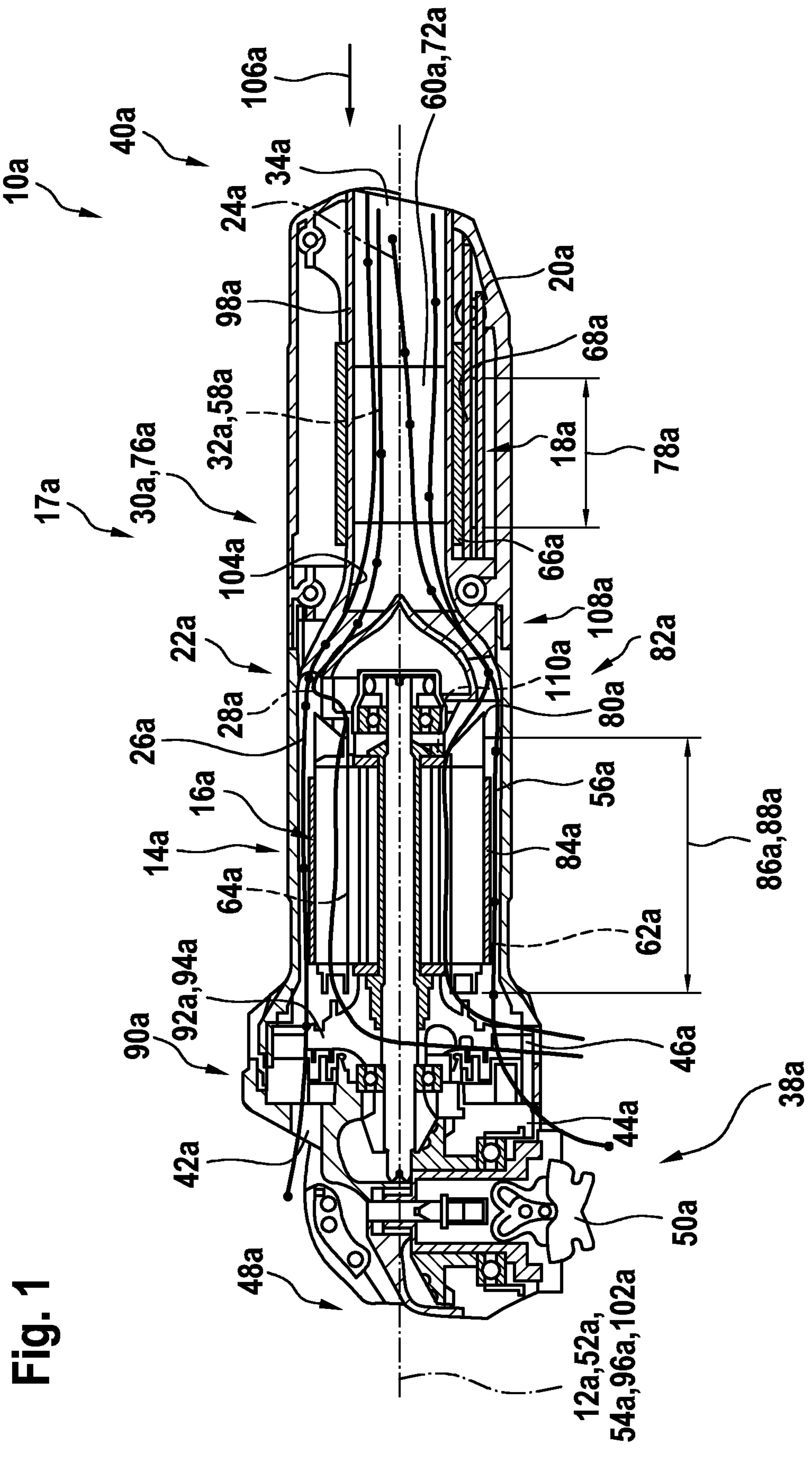
FIG. 1 shows a side view of a longitudinal section of a power tool according to the disclosure with an electronic device and a fluid cooling unit, shows a schematic representation of a separating unit of the power tool FIG. 2 according to the disclosure.

FIG. 1 shows a side view of a power tool 10*a*, the power tool 10*a* being shown in section along a plane through a longitudinal axis 12*a* of the power tool 10*a*. The power tool 10*a* is realized as a hand-held power tool. The power tool 10*a* is realized as an electric power tool. The power tool 10*a* is realized as an angle grinder. However, other designs of the power tool 10*a* are also conceivable, for example as a drill, as a screwdriver, as a hammer, as a vacuum cleaner or the like. The power tool 10*a* has a housing unit 14*a*. The power tool 10*a* has a drive unit 16*a*, which is arranged within the housing unit 14*a* and which in particular in realized as a brushless DC motor.

However, other designs of the drive unit 16*a* are also conceivable, for example as a universal motor. The power tool 10*a* comprises an electronic device 17*a*. The power tool 10*a* has an electronic unit 18*a*, which is designed at least to control and supply electricity to the drive unit 16*a*, and in particular is realized as part of the electronic device 17*a*. It is also conceivable for the electronic unit 18*a* to be designed to control and/or supply other components of the power tool 10*a* such as, for example, display elements, interfaces or the like.

The electronic unit 18*a* is designed to commutate the drive unit 16*a*. The electronic unit 18*a* comprises a printed circuit board 20*a*, arranged on which in particular are a processor unit and a memory unit that in particular are not shown in FIG. 1. The power tool 10*a* has a separating unit 22*a*, which is designed to divide at least one fluid stream 24*a* conducted through the housing unit 14*a*, in particular in dependence on a foreign body density, into at least two sub-streams 26*a*, 28*a*, one sub-stream 26*a* of the sub-streams 26*a*, 28*a* having a higher foreign body density in comparison with another sub-stream 28*a* of the sub-streams 26*a*, 28*a*. The power tool 10*a* has a fluid cooling unit 30*a* that is designed to cool the drive unit 16*a* by means of the at least two sub-streams 26*a*, 28*a*. The fluid cooling unit 30*a* is realized as part of the electronic device 17*a*. The fluid cooling unit 30*a* is designed to cool the electronic unit 18*a* by means of a fluid, or the fluid stream 24*a*. The electronic unit 18*a* is arranged at least largely, in particular entirely, outside of a fluid flow path 32*a* of the fluid cooling unit 30*a*. The fluid cooling unit 30*a* is designed to cool the drive unit 16*a* and the electronic unit 18*a*. The fluid cooling unit 30*a* is designed to conduct the fluid, or fluid stream 24*a*, through the housing unit 14*a*.

The fluid cooling unit 30*a* comprises an intake opening 34*a* for drawing in the fluid, or fluid stream 24*a*. The intake opening 34*a* is delimited by the housing unit 14*a* and arranged on a side of the power tool 10*a*, in particular of the housing unit 14*a*, that faces away from a working region 38*a* of the power tool 10*a*. The intake opening 34*a* is realized along the longitudinal axis 12*a* of the power tool 10*a*, in particular at an end region 40*a* of the power tool 10*a* that is realized along the longitudinal axis 12*a* of the power tool 10*a* and that at least partially faces away from the working region 38*a*.

The fluid cooling unit 30*a* comprises a multiplicity of outlet openings 42*a*, 44*a*, 46*a* for draining the fluid, or the fluid stream 24*a*, from the power tool 10*a*. The outlet openings 42*a*, 44*a*, 46*a* are arranged in an end region 48*a* of the power tool 10*a* that faces away from the intake opening 34*a*. The outlet openings 42*a*, 44*a*, 46*a* are arranged in a region around a tool holder 50*a* of the power tool 10*a*. One outlet opening 42*a* of the multiplicity of outlet openings 42*a*, 44*a*, 46*a* is arranged on a side of the power tool 10*a*, in particular of the housing unit 14*a*, that faces away from the working region 38*a*. Two outlet openings 44*a*, 46*a* of the multiplicity of outlet openings 42*a*, 44*a*, 46*a* are arranged on a side of the power tool 10*a*, in particular of the housing unit 14*a*, that faces toward the working region 38*a*. One outlet opening 44*a* of the two outlet openings 44*a*, 46*a* is designed to divert the sub-stream 26*a*. Another outlet opening 46*a* of the two outlet openings 44*a*, 46*a* is designed to divert the other sub-stream 28*a*.

The drive unit 16*a* has a drive axis 52*a*, about which a rotor of the drive unit 16*a* is driven. The drive axis 52*a* of the drive unit 16*a* is oriented at least substantially parallel to the longitudinal axis 12*a* of the power tool 10*a*. The drive axis 52*a* of the drive unit 16*a* is oriented coaxially with a direction of main extent 54*a* of the fluid cooling unit 30*a*. The fluid cooling unit 30*a* comprises a channel element, in particular a fluid cooling element 66*a*, the fluid flow path 32*a*, in particular in a region in which the electronic unit 18*a* is arranged, running at least largely through the channel element. The fluid flow path 32*a* extends from the intake opening 34*a* of the fluid cooling unit 30*a* to the outlet openings 42*a*, 44*a*, 46*a* of the fluid cooling unit 30*a*. The fluid cooling unit 30*a* has a guide section 58*a* along which the fluid flow path 32*a* is realized. In particular, the guide section 58*a* is realized along a direction of main extent 54*a* of the fluid flow path 32*a*. The electronic unit 18*a* is arranged at least largely, in particular entirely, outside of a flow recess 60*a*, enclosed by the fluid cooling unit 30*a*, for conducting the fluid, or fluid stream 24*a*. The fluid cooling unit 30*a* is realized and/or the electronic unit 18*a* is arranged in such a manner that the electronic unit 18*a*, in particular via a channel element, in particular the fluid cooling element 66*a*, of the fluid cooling unit 30*a*, is arranged at a distance from the fluid flow path 32*a* and/or the flow recess 60*a* enclosed by the fluid cooling unit 30*a*. The fluid cooling unit 30*a* is designed to conduct the fluid stream 24*a* via the intake opening 34*a*, through the channel element, in particular the fluid cooling element 66*a*, past the electronic unit 18*a* and the drive unit 16*a* to the outlet openings 42*a*, 44*a*, 46*a*. The channel element, in particular the fluid cooling element 66*a*, is arranged at least substantially entirely within the housing unit 14*a*. The drive unit 16*a*, the electronic unit 18*a* and the fluid cooling unit 30*a*, in particular with the exception of the intake opening 34*a* and/or the outlet openings 42*a*, 44*a*, 46*a*, are arranged at least substantially entirely within the housing unit 14*a*.

The fluid, or fluid stream 24*a*, aspirated via the intake opening 34*a* contains a large number of foreign bodies. In particular, the foreign bodies in the fluid stream 24*a* and/or the sub-streams 26*a*, 28*a* are dust particles, residues from a machined workpiece, such as, for example metal chips, impurities in the fluid stream 24*a* or the like. The fluid, or fluid stream 24*a*, is at least partially, in particular at least largely, composed of air. The fluid cooling unit 30*a* is realized in such a manner that when the drive unit 16*a* is cooled by means of the sub-streams 26*a*, 28*a*, in particular the sub-stream 26*a* and the further sub-stream 28*a*, thermal energy is transferred from the drive unit 16*a* to the sub-streams 26*a*, 28*a*. The fluid cooling unit 30*a* is designed to conduct the heat transferred to the sub-streams 26*a*, 28*a*, in particular the sub-stream 26*a* and the other sub-stream 28*a*, respectively, out of the power tool 10*a*, in particular the housing unit 14*a*, via the sub-streams 26*a*, 28*a*. The fluid cooling unit 30*a* is designed to conduct the fluid stream 24*a* via the intake opening 34*a* through at least one channel element, in particular the fluid cooling element 66*a*, of the fluid cooling unit to the separating unit 22*a*. The separating unit 22*a* and the fluid cooling unit 30*a* constitute a single piece, in particular the channel element, in particular the fluid cooling element 66*a*, of the fluid cooling unit 30*a* being designed to delimit the fluid stream 24*a* on the guide section 58*a* and/or on guide sub-sections 62*a*, 64*a* of the sub-stream 28*a* and of the other sub-stream 28*a*, respectively. The fluid cooling unit 30*a* is designed to conduct the sub-streams 26*a*, 28*a*, after flowing through the separating unit 22*a*, at least partially in the direction of the drive unit 16*a*, for the purpose of cooling the drive unit 16*a*.

The fluid cooling unit 30*a* comprises the fluid cooling element 66*a*, against which the electronic unit 18*a* bears, at least partially. The electronic unit 18*a* comprises a heat diffusion element 68*a* for dissipating heat. The heat diffusion element 68*a* is realized as a copper block and is designed to collect heat generated in particular during operation of the electronic unit 18*a* and/or to transfer it to the fluid cooling element 66*a*. The electronic unit 18*a*, in particular the heat diffusion element 68*a*, has at least one support surface 70*a* (see FIG. 4). The electronic unit 18*a*, in particular the heat diffusion element 68*a*, bears against the fluid cooling element 66*a* via the support surface 70*a*. The heat diffusion element 68*a* is made of a material having a thermal conductivity of at least 10 W/(m·K), preferably at least 50 W/(m·K), more preferably at least 100 W/(m·K), particularly preferably at least 200 W/(m·K), and most particularly preferably at least 400 W/(m·K). The heat diffusion element 68*a* is arranged on the printed circuit board 20*a*. The support surface 70*a* is realized as a flat surface. It is also conceivable, however, for the support surface 70*a* to be at least partially curved. The fluid cooling element 66*a* delimits a fluid channel 72*a*. The fluid, or fluid stream 24*a*, is conducted past the electronic unit 18*a* through the fluid channel 72*a*, or fluid cooling element 66*a*. The fluid cooling element 66*a* is realized in such a manner that the fluid channel 72*a* has a cylindrical shape. The fluid cooling element 66*a* is realized as a channel element for conducting the fluid, or fluid stream 24*a*, the electronic unit 18*a* bearing at least partially against an outer wall 74*a* of the fluid cooling element 66*a* (see FIG. 4). The support surface 70*a* bears against the outer wall 74*a* of the fluid cooling element 66*a*. The heat diffusion element 68*a*, via a side on which the support surface 70*a* is arranged, bears with full surface contact against the fluid cooling element 66*a*. The fluid cooling element 66*a*, at least in a region against which the electronic unit 18*a* bears, is made of a material having a thermal conductivity of at least 10 W/(m·K), preferably at least 50 W/(m·K), more preferably at least 100 W/(m·K), particularly preferably at least 200 W/(m·K), and most particularly preferably at least 400 W/(m·K). The fluid cooling element 66*a* is made of aluminum. It is also conceivable, however, for the fluid cooling element 66*a* to be made of another thermally conductive, in particular metallic, material.

The fluid flow path 32*a* extends in a proximity region 76*a* of the electronic unit 18*a* at least substantially entirely within the fluid cooling element 66*a*. The fluid cooling element 66*a* is designed, in particular in the proximity region 76*a* of the electronic unit 18*a*, to conduct an entire fluid stream 24*a* that in particular flows via the intake opening 34*a* into the fluid cooling unit 30*a*. The fluid flow path 32*a* runs, in particular in the proximity region 76*a* of the electronic unit 18*a*, at least substantially entirely through the fluid cooling element 66*a*, in particular the fluid channel 72*a*. Alternatively, it is conceivable for the fluid cooling element 66*a* to delimit at least, in particular exactly, two fluid channels 72*a*, the fluid flow path 32*a*, in particular in the proximity region 76*a* of the electronic unit 18*a*, running at least substantially entirely through the fluid cooling element 66*a*, in particular the fluid channels 72*a*. The proximity region 76*a* of the electronic unit 18*a* extends along the direction of main extent 54*a* of the fluid cooling unit 30*a*, in particular the of fluid cooling element 66*a*, at least over an entire length 78*a* of the electronic unit 18*a*. The drive unit 16*a* is arranged, in particular fluidically, behind the electronic unit 18*a* and the fluid cooling element 66*a*, as viewed from the intake opening 34*a*. The separating unit 22*a* is arranged, in particular fluidically, behind the electronic unit 18*a* and the fluid cooling element 66*a* and in front of the drive unit 16*a*, as viewed from the intake opening 34*a*.

The separating unit 22*a* comprises a separating element 80*a*, realized as a channel element, arranged in a proximity region 82*a* of the drive unit 16*a* and designed to divide the fluid stream 24*a*. The separating element 80*a* is designed to conduct the fluid stream 24*a* on the guide section 58*a* and to divide it into the sub-stream 26*a* and the other sub-stream 28*a*. The separating element 80*a* is realized as a passive element, in particular the separating element 80*a* being designed to divide the fluid stream 24*a* by a shape of the separating element 80*a*, in particular as the fluid stream 24*a* flows through it. In particular, the separating element 80*a* is static, or immobile. In particular, the separating element 80*a* is described in detail in the description of FIG. 2. The separating unit 22*a*, in particular the separating element 80*a*, is realized fluidically between the intake opening 34*a* and the drive unit 16*a*. The separating element 80*a* arranged in the proximity region 82*a* of the drive unit 16*a* is arranged, in particular fastened, directly to the drive unit 16*a*, in particular to a housing of the drive unit 16*a*. It is conceivable for the separating element 80*a* arranged in the proximity region 82*a* of the drive unit 16*a* to constitute a single piece with the drive unit 16*a*, in particular the housing of the drive unit 16*a*.

A channel element 56*a* of the fluid cooling unit 30*a* is designed to guide the sub-stream 26*a*, in particular separately from the other sub-stream 28*a*, at least partially past an outer wall 84*a* of the drive unit 16*a*. It is also conceivable for the fluid cooling unit 30*a* to comprise a multiplicity of channel elements 56*a* designed to conduct the sub-stream 26*a*, in particular the channel elements 56*a* being arranged, in a distributed manner around the longitudinal axis 12*a*, around the drive unit 16*a*. The separating unit 22*a* and the fluid cooling unit 30*a* are realized in such a manner that the sub-stream 26*a*, in particular in a region along the drive unit 16*a*, is conducted, at least largely separately from the other sub-stream 28*a*, through the housing unit 14*a*. The fluid cooling unit 30*a* is designed to conduct the other sub-stream 28*a* into, or through, the drive unit 16*a* for the purpose of cooling the drive unit 16*a*. The channel element 56*a* is arranged outside of the drive unit 16*a*, on the outer wall 84*a* of the drive unit 16*a*. The channel element 56*a* is arranged directly on the drive unit 16*a*, in particular on the outer wall 84*a* of the drive unit 16*a*. The channel element 56*a* bears flatly against the outer wall 84*a* of the drive unit 16*a*. The channel element 56*a* is designed to transfer heat from the drive unit 16*a*, in particular the outer wall 84*a* of the drive unit 16*a*, to the sub-stream 26*a*, in particular the drive unit 16*a* being cooled by the sub-stream 26*a*. The channel element 56*a* extends along an entire length 86*a* of the drive unit 16*a*, on the outer wall 84*a* of the drive unit 16*a*. The channel 56*a* element is made at least largely of a thermally conductive material that, in particular, has a thermal conductivity of, in particular, at least 10 W/(m·K), preferably at least 40 W/(m·K), more preferably at least 100 W/(m·K), and particularly preferably at least 200 W/(m·K). The channel element 56*a* is at least substantially rectilinear, in particular along an entire length 88*a* of the outer wall 74*a* of the drive unit 16*a*. In particular, the channel element 56*a* is, at least largely, at least substantially parallel to the outer wall 84*a* of the drive unit 16*a*, in particular an outer surface of the outer wall 84*a* of the drive unit 16*a*, that faces toward the channel element 56*a*, or that bears at least partially against the channel element 56*a*.

The separating unit 22*a* comprises a conveying unit 90*a*, which is at least partially arranged within the fluid cooling unit 30*a* and is designed to convey at least the sub-stream 26*a* out of or through the housing unit 14*a*. The conveying unit 90*a* is realized as a flow pump. The conveying unit 90*a* is designed to aspirate the sub-stream 26*a* via the fluid cooling unit 30*a*, in particular through the intake opening 34*a*. The conveying unit 90*a* is designed to convey the fluid stream 24*a*, in particular along the guide section 58*a*, through the separating unit 22*a* and to divide it, in particular by means of a conveying speed and the separating element 80*a*, into the sub-streams 26*a*, 28*a*, in particular the sub-stream 26*a* and the other sub-stream 28*a*. The conveying unit 90*a* is designed to convey the sub-streams 26*a*, 28*a*, in particular the sub-stream 26*a* and the other sub-stream 28*a*, in particular after cooling of the drive unit 16*a*, through the outlet openings 42*a*, 44*a*, 46*a* out of the power tool 10*a*, in particular out of the housing unit 14*a*. The conveying unit 90*a* comprises a conveying element 92*a*, which is realized, at least partially, as an axial fan. The conveying element 92*a* constitutes a single piece with a fan impeller 94*a* of the drive unit 16*a*. The conveying element 92*a* is arranged fluidically behind the drive unit 16*a*, as viewed from the intake opening 34*a*. The conveying unit 90*a* is designed to convey the sub-stream 26*a* and the other sub-stream 28*a* separately from each other through the housing unit 14*a* and/or the fluid cooling unit 30*a*.

The conveying unit 90*a*, in particular together with the fluid cooling unit 30*a*, is designed to convey the sub-streams 26*a*, 28*a*, in particular after the drive unit 16*a*, each in different directions that in particular are directed radially outward from a drive axis 96*a* of the conveying element 92*a*. The conveying element 92*a* is arranged, in particular fluidically, behind the drive unit 16*a*, as viewed from the intake opening 34*a*. The conveying element 92*a* is designed to convey the sub-stream 26*a*, in particular in a proximity region of the conveying element 92*a*, in a direction oriented at least substantially parallel to the drive axis 96*a* of the conveying element 92*a*. The conveying element 92*a* is designed to convey the other sub-stream 28*a*, in particular in a proximity region of the conveying element 92*a*, in a direction oriented at least substantially perpendicularly to the drive axis 96*a* of the conveying element 92*a*. The conveying unit 90*a* is designed to convey the sub-stream 26*a* and the other sub-stream 28*a* out of the power tool 10*a*, or the housing unit 14*a*, each through differently realized and/or spaced outlet openings 42*a*, 44*a*, 46*a* of the fluid cooling unit 30*a*. The conveying unit 90*a* is designed to convey the sub-stream 26*a* through the outlet openings 42*a*, 44*a*, 46*a*. The conveying unit 90*a* is designed to convey the other sub-stream 28*a* through the outlet openings 42*a*, 44*a*, 46*a*.

The fluid cooling unit 30*a* comprises a main channel element 98*a*, for conducting the fluid stream 24*a*, which is arranged in front of the drive unit 16*a*, as viewed from the intake opening 34*a*, in particular as viewed along the direction of main extent 54*a* of the fluid cooling unit 30*a*. The fluid cooling unit 30*a* comprises, along the direction of main extent 54*a* of the fluid cooling unit 30*a*, in a region of the main channel element 98*a*, only exactly one guide section 58*a* that is arranged in particular within the main channel element 98*a*. The guide section 58*a* extends from the intake opening 34*a* through the fluid cooling unit 30*a* to the outlet openings 42*a*, 44*a*, 46*a*. The direction of main extent 54*a* of the fluid cooling unit 30*a* is oriented at least substantially parallel to a direction of main extent 102*a* of the drive unit 16*a* and/or of the housing unit 14*a* and to the drive axis 96*a* of the conveying element 92*a*. The main channel element 98*a* extends from the intake opening 34*a*, in particular along the direction of main extent of the fluid cooling unit 30*a*, to the separating unit 22*a*. The main channel element 98*a* is connected to the fluid cooling element 66*a* so as to constitute a single piece. The main channel element 98*a*, the fluid cooling element 66*a* and the channel element 56*a* of the fluid cooling unit 30*a* each have at least substantially smooth inner walls 104*a*, which in particular delimit the fluid channels 72*a* guiding the fluid stream 24*a*. Preferably, the main channel element 98*a*, the fluid cooling element 66*a* and the channel element 56*a* of the fluid cooling unit 30*a*, in particular the inner walls 104*a* of the main channel element 98*a*, of the fluid cooling element 66*a* and of the channel element 56*a* of the fluid cooling unit 30*a*, are realized without edges, in particular the inner walls 104*a* of the main channel element 98*a*, of the fluid cooling element 66*a* and of the channel element 56*a* of the fluid cooling unit 30*a* merging continuously into one another along a guide direction 106*a* of the fluid stream 24*a*.

In addition, it is conceivable for the power tool 10*a* to comprise a sensor unit 108*a*, which is merely indicated in the figures. The sensor unit 108*a* comprises at least one sensor element 110*a* for sensing a temperature of the drive unit 16*a*. Preferably, the electronic unit 18*a* is designed to control by open-loop and/or closed-loop control, preferably to limit, a performance characteristic, for example a maximum rotational speed, of the drive unit 16*a* in dependence on the sensed temperature in order to avoid overheating of the drive unit 16*a*, or a failure of the power tool 10*a*. It is also conceivable for the electronic unit 18*a* to be designed to issue a warning to a user, for example via an optical, acoustic and/or haptic signal, in dependence on the sensed temperature, in particular if a limit value of the temperature is exceeded.

Figure 2:
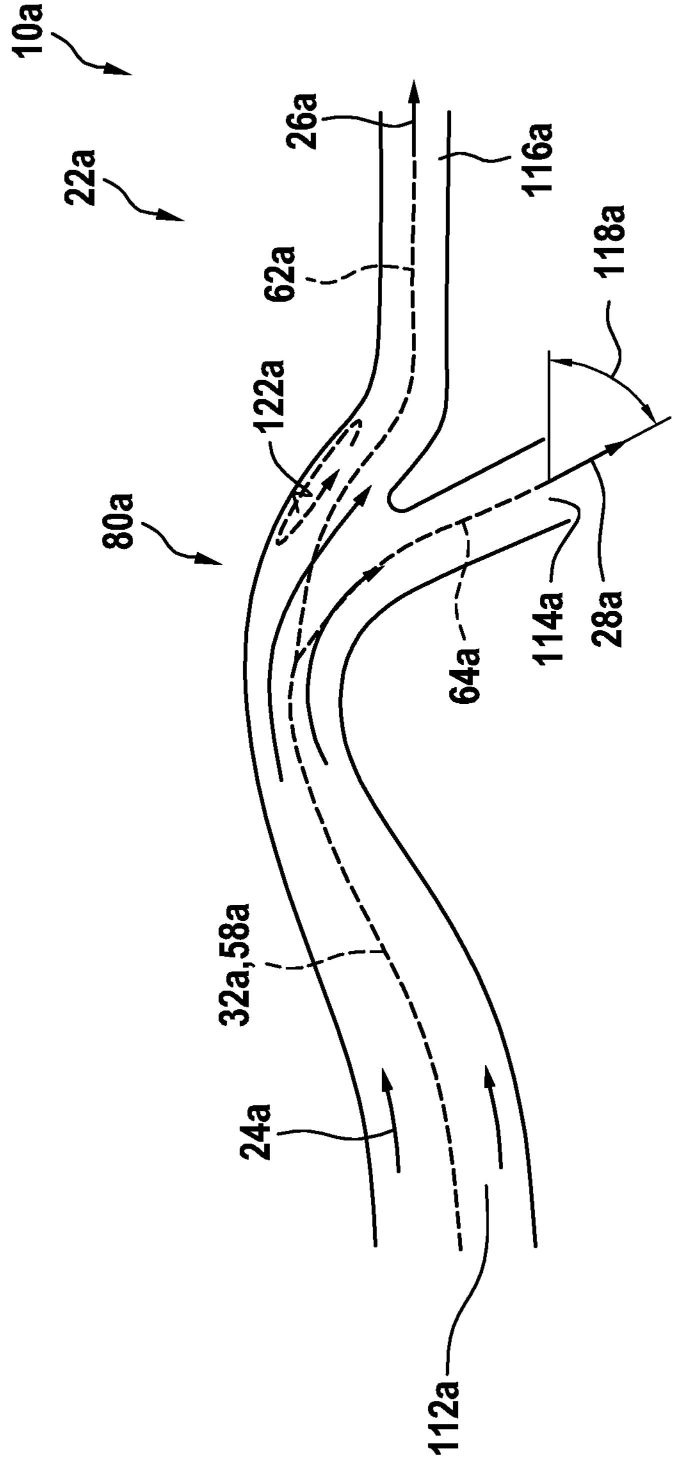

FIG. 2 shows a detail view of the separating element 80*a* on one side of the longitudinal axis 12*a* of the power tool 10*a*. The separating unit 22*a* is realized in such a manner that a value of the foreign body density of the sub-stream 26*a* is greater than a value of the foreign body density of the other sub-stream 28*a*, in particular by at least 50%, preferably at least 70%, more preferably at least 80% and particularly preferably at least 90%, in particular the foreign bodies having a size, in particular a mean diameter, of at least 500 μm, preferably at least 100 μm and particularly preferably at least 20 μm. The separating unit 22*a* is designed to divide the fluid stream 24*a* into the sub-stream 26*a* and the other sub-stream 28*a* by a geometric configuration of the guide section 58*a* of the, in particular aspirated, fluid stream 24*a*, in particular the sub-stream 26*a* having a higher foreign body density in comparison with the other sub-stream 28*a*. The separating unit 22*a* is designed to conduct the sub-stream 26*a* and the other sub-stream 28*a*, in particular from the guide section 58*a* to the various guide sub-sections 62*a*, 64*a*.

The separating element 80*a* realizes a fluid inlet 112*a* for conducting the fluid stream 24*a*, and two fluid outlets 114*a*, 116*a* for conducting the sub-stream 26*a* and the other sub-stream 28*a*, respectively. The separating element 80*a* has an at least partially curved basic shape in a sectional plane that comprises the guide section 58*a* and/or at least one of the guide sub-sections 62*a*, 64*a* and that corresponds in particular to an image plane of FIG. 2. The separating element 80*a* is realized in such a manner that the guide section 58*a*, in a region of the fluid inlet 114*a*, has an angle 118*a* of in particular at least 30°, preferably at least 60° and particularly preferably at least 80° to the guide sub-section 64*a* of the other sub-stream 28*a* in a region of the fluid outlet 114*a*. The separating element 80*a* has a basic shape realized in such a manner that foreign bodies are conducted onto a path that deviates from the guide section 58*a* of the fluid stream 24*a*, in particular the guide sub-section 64*a* of the other sub-stream 28*a*, in particular onto the guide sub-section 62*a* of the sub-stream 26*a*. The separating element 80*a* is realized in such a manner that the sub-stream 26*a* is guided at least partially separately from the other sub-stream 28*a*. The separating element 80*a* is arranged on the fluid cooling unit 30*a*, or is realized as part of the fluid cooling unit 30*a*. The separating element 80*a* constitutes a single piece with the fluid cooling unit 30*a*, in particular at least one channel element 56*a* of the fluid cooling unit 30*a*, which, however, is not shown in FIG. 2. The separating unit 22*a*, in particular the separating element 80*a*, is realized fluidically between the intake opening 34*a* and the drive unit 16*a*.

Foreign bodies within the fluid stream 24*a*, when flowing through the separating element 80*a* in a flow direction along the guide section 58*a*, are moved by their inertia on a path that depends on a mass of the foreign bodies. Preferably, foreign bodies that have a larger mass fly on a less curved path than foreign bodies that have a smaller mass. As they flow through the separating element 80*a*, foreign bodies that have a large mass are conducted to a fluid outlet 116*a* of the fluid outlets 114*a*, 116*a* that is designed to conduct the sub-stream 26*a*. Another fluid outlet 114*a* of the fluid outlets 112*a*, 114*a* is designed to conduct the other sub-stream 28*a*. Preferably, the guide section 58*a* in the region of the fluid inlet 112*a* has a smaller angle to the guide sub-section 62*a* of the sub-stream 26*a* in the region of the fluid outlet 116*a* than to the guide sub-section 64*a* of the other sub-stream 28*a* in the region of the other fluid outlet 114*a*. Preferably, the separating element 80*a* is realized in such a manner that a turbulence of the fluid, or fluid stream, is realized on an inner wall 122*a* of the separating element 80*a* that delimits the guide sub-section 62*a* of the sub-stream 26*a*.

Figure 3:
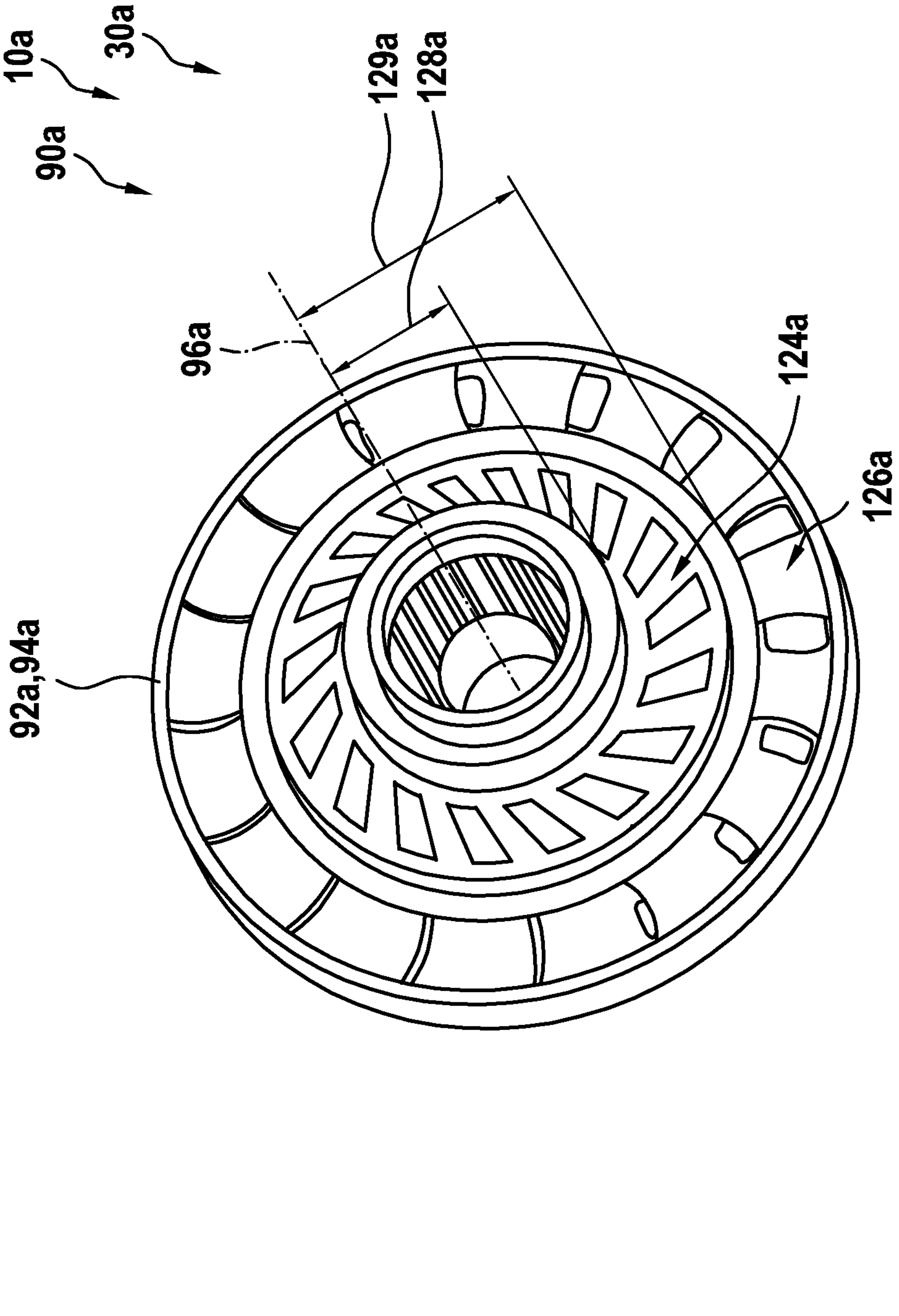
FIG. 3 shows a perspective view of a conveying element of a conveying unit of the power tool according to the disclosure, for conveying a fluid.

FIG. 3 shows a perspective view of the conveying element 92*a*. The conveying element 92*a* of the conveying unit 90*a* is realized as a radial fan in at least one region 124*a* of the conveying element 92*a*. The conveying element 92*a* is realized as an axial fan in at least one further region 126*a* of the conveying element 92*a*. The region 124*a* of the conveying element 92*a* is surrounded by the further region 126*a*, as viewed along the drive axis 96*a* of the conveying element 92*a*. The region 124*a* of the conveying element 92*a* is at a lesser minimum radial distance 128*a* from the drive axis 96*a* of the conveying element 92*a* than the further region 126*a* of the conveying element 92*a* (cf. distance 129*a*). The conveying element 92*a* is realized as a two-part fan impeller. The region 124*a* of the conveying element 92*a* is designed to convey the other sub-stream 28*a* through the drive unit 16*a*. The further region 126*a* of the conveying element 92*a* is designed to convey the sub-stream 26*a* through the channel element 56*a*, or along the outer wall 74*a* of the drive unit 16*a*.

Figure 4:
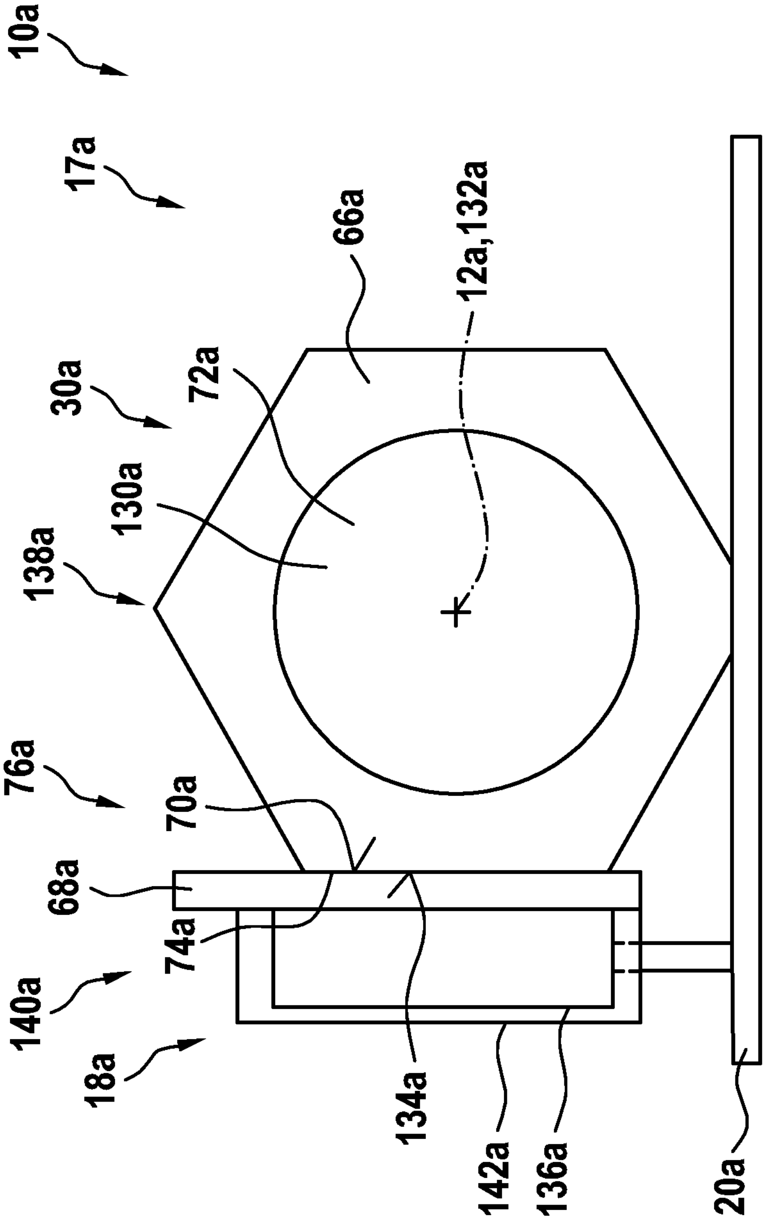
FIG. 4 shows a schematic representation of a cross-section of the electronic unit with a round fluid channel.

FIG. 4 shows a schematic cross-section of the electronic device 17*a* in the proximity region 76*a* of the electronic unit 18*a*. The electronic unit 18*a* is arranged directly on the fluid cooling element 66*a*. The electronic unit 18*a* bears at least partially against the outer wall 74*a* of the fluid cooling element 66*a*. The fluid cooling element 66*a* delimits the fluid channel 72*a*, for conducting the fluid, that has an at least substantially circular cross-sectional area 130*a*. The cross-sectional area 130*a* of the fluid channel 72*a* is oriented at least substantially perpendicularly to a central axis 132*a* of the fluid cooling element 66*a*. The cross-sectional area 130*a* of the fluid channel 72*a* is oriented at least substantially perpendicularly to the support surface 70*a* and/or the outer wall 74*a* of the fluid cooling element 66*a*. The cross-sectional area 130*a* of the fluid channel 72*a* has a contour that is at least substantially circular. Preferably, a maximum value of the cross-sectional area 130*a* of the fluid channel 72*a* delimited by the fluid cooling element 66*a* is at least 100 $mm^2$, preferably at least 200 $mm^2$, more preferably at least 400 $mm^2$, and particularly preferably at least 600 $mm^2$. The fluid cooling element 66*a* has, on the outer wall 74*a* of the fluid cooling element 66*a*, at least one contact surface 134*a* that at least substantially corresponds to the support surface 70*a* of the electronic unit 18*a*, the electronic unit 18*a* bearing against the contact surface 134*a* of the fluid cooling element 66*a* via the support surface 70*a*. The contact surface 134*a* and the support surface 70*a* are realized as flat surfaces. It is also conceivable, however, for the contact surface 134*a* and the support surface 70*a* to be realized as at least partially curved surfaces. The electronic unit 18*a*, in particular an electronic component 136*a* of the electronic unit 18*a*, is attached, for example glued and/or screwed, to the fluid cooling element 66*a*, in particular the contact surface 134*a*, via the support surface 70*a*. The contact surface 134*a* and the support surface 70*a* have a maximum area of at least 100 $mm^2$, preferably at least 200 $mm^2$, more preferably at least 400 $mm^2$, and particularly preferably at least 600 $mm^2$. Preferably, the contact surface 134*a* and/or the support surface 70*a* have/has a maximum area of at most 5000 $mm^2$, preferably at most 3000 $mm^2$ and particularly preferably at most 2000 $mm^2$. The support surface 70*a* is arranged entirely on the heat diffusion element 68*a*. The fluid cooling element 66*a* has a hexagonal basic shape 138*a*, the contact surface 134*a* being realized as one side of the basic shape 138*a*. The heat diffusion element 68*a* is arranged on the electronic component 136*a* of the electronic unit 18*a* and is designed to dissipate heat generated by the electronic component 136*a* to the fluid cooling element 66*a*. The electronic component 136*a* is realized as a power semiconductor such as, for example an IGBT or a MOSFET. It is also alternatively or additionally conceivable for there to be a processor unit, a memory unit or the like arranged on the heat diffusion element 68*a* for the purpose of cooling. The electronic component 136*a* is attached to the printed circuit board 20*a* of the electronic unit 18*a*. Other designs of the electronic unit 18*a*, in particular of the heat diffusion element 68*a*, are also conceivable.

The electronic device 17*a* comprises a sealing unit 140*a*, which is designed to close the electronic unit 18*a*, together with the fluid cooling unit 30*a*, at least partially, in particular with respect to the fluid flow path 32*a*, in an at least substantially airtight and/or watertight manner. The sealing unit 140*a* has a sealing element 142*a*, which is made of a thermally insulating material, in particular rubber. The sealing element 142*a* bears at least partially against the heat diffusion element 68*a*. It is also conceivable for the sealing element 142*a* to entirely enclose the heat diffusion element 68*a*, together with the fluid cooling element 66*a*. Alternatively, it is conceivable for the sealing element 142*a* to be made of a thermally conductive material that, in particular, has a thermal conductivity of at least 10 W/(m·K), preferably at least 50 W/(m·K), more preferably at least 100 W/(m·K), particularly preferably at least 200 W/(m·K), and most particularly preferably at least 400 W/(m·K). The sealing element 142*a* encloses the electronic component 136*a* of the electronic unit 18*a*, together with the fluid cooling element 66*a* and the heat diffusion element 68*a*, at least substantially entirely. It is conceivable for a volume enclosed between the sealing element 142*a* and the electronic unit 18*a*, or the fluid cooling element 66*a* and/or the heat diffusion element 68*a*, to be filled with or evacuated by a thermally insulating gas. In particular, the evacuated volume has a maximum pressure of in particular less than 1000 mbar, preferably less than 300 mbar, more preferably less than 1 mbar, and particularly preferably less than $10^{-2}$ mbar.

Figure 5:
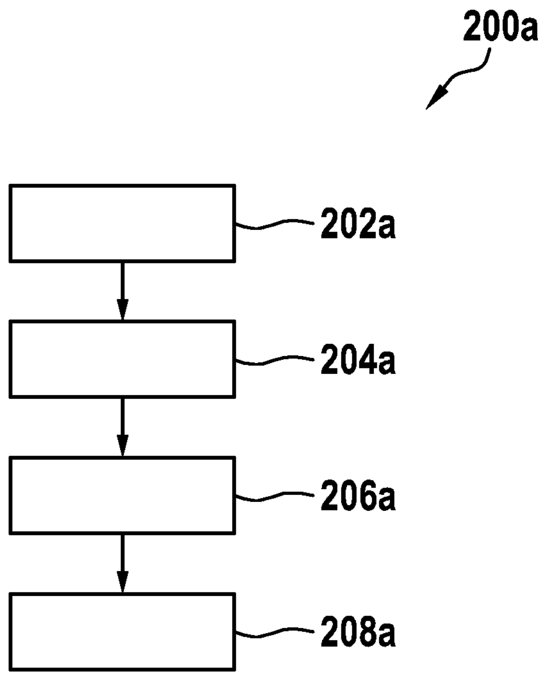
FIG. 5 shows a schematic representation of an exemplary sequence of a process according to the invention for cooling a drive unit of the power tool according to the disclosure.

FIG. 5 shows an exemplary sequence of a process 200*a* for cooling the drive unit 16*a*, or the electronic unit 18*a*, of the power tool 10*a*. In a process step 202*a* of the process 200*a*, the fluid stream 24*a* is drawn through the intake opening 34*a* by means of the conveying unit 90*a*.

In a further process step 204*a* of the process 200*a*, the fluid stream 24*a* flowing through the main channel element 98*a* is used to cool the electronic unit 18*a* via the fluid cooling element 66*a*. When flowing through the main channel element 98*a*, the fluid stream 24*a* flows through the fluid cooling element 66*a*, with heat being dissipated from the electronic unit 18*a*, via the fluid cooling element 66*a*, to the fluid stream 24*a* for the purpose of cooling the electronic unit 18*a*. In a further process step 206*a* of the process 200*a*, the separating unit 22*a*, in particular the separating element 80*a*, divides the fluid stream 24*a* into the sub-stream 26*a*, in particular the one loaded with foreign bodies, and the other sub-stream 28*a*, in particular the one containing few foreign bodies. The sub-stream 26*a* is guided by means of the separating unit 22*a* and the fluid cooling unit 30*a*, through the channel element 56*a*, along the outer wall 84*a* of the drive unit 16*a*, the drive unit 16*a* being cooled via the sub-stream 26*a*, in particular heat being transferred from the outer wall 84*a* of the drive unit 16*a* to the sub-stream 26*a*. The other sub-stream 28*a* is conducted into, or through, the drive unit 16*a* by means of the separating unit 22*a* and the fluid cooling unit 30*a*, the drive unit 16*a*, in particular windings of the drive unit 16*a*, being cooled by means of the other sub-stream 28*a*, in particular heat being transferred from the drive unit 16*a* to the other sub-stream 28*a*. In a further process step 208*a* of the process 200*a*, the other sub-stream 28*a* is conveyed via the region 124*a* of the conveying element 92*a* in a direction toward the working region 38*a*, or the outlet opening 46*a*, and is conveyed out of the power tool 10*a*, in particular out of the housing unit 14*a* and/or the fluid cooling unit 30*a*, through the outlet opening 46*a*. In a process step of the process 200*a*, in particular the process step 208*a*, the sub-stream 26*a* is conveyed via the further region 126*a* of the conveying element 92*a* in directions oriented at least substantially parallel to the drive axis 96*a* of the conveying element 92*a*, and is conducted via the fluid cooling unit 30*a* to the outlet openings 42*a*, 44*a*, or out of the power tool 10*a*, in particular out of the housing unit 14*a* and/or the fluid cooling unit 30*a*.

FIGS. 6 to 11 show a further exemplary embodiments of the disclosure. The following descriptions and the drawings are limited substantially to the differences between the exemplary embodiments and, in principle, reference may also be made to the drawings and/or the description of the other exemplary embodiments, in particular of FIGS. 1 to 5, in respect of components having the same designation, in particular in respect of components denoted by the same references. To distinguish the exemplary embodiments, the letter a has been appended to the references of the exemplary embodiment in FIGS. 1 to 5. In the exemplary embodiments of FIGS. 6 to 11, the letter a is replaced by the letters b to g.

Figure 6:
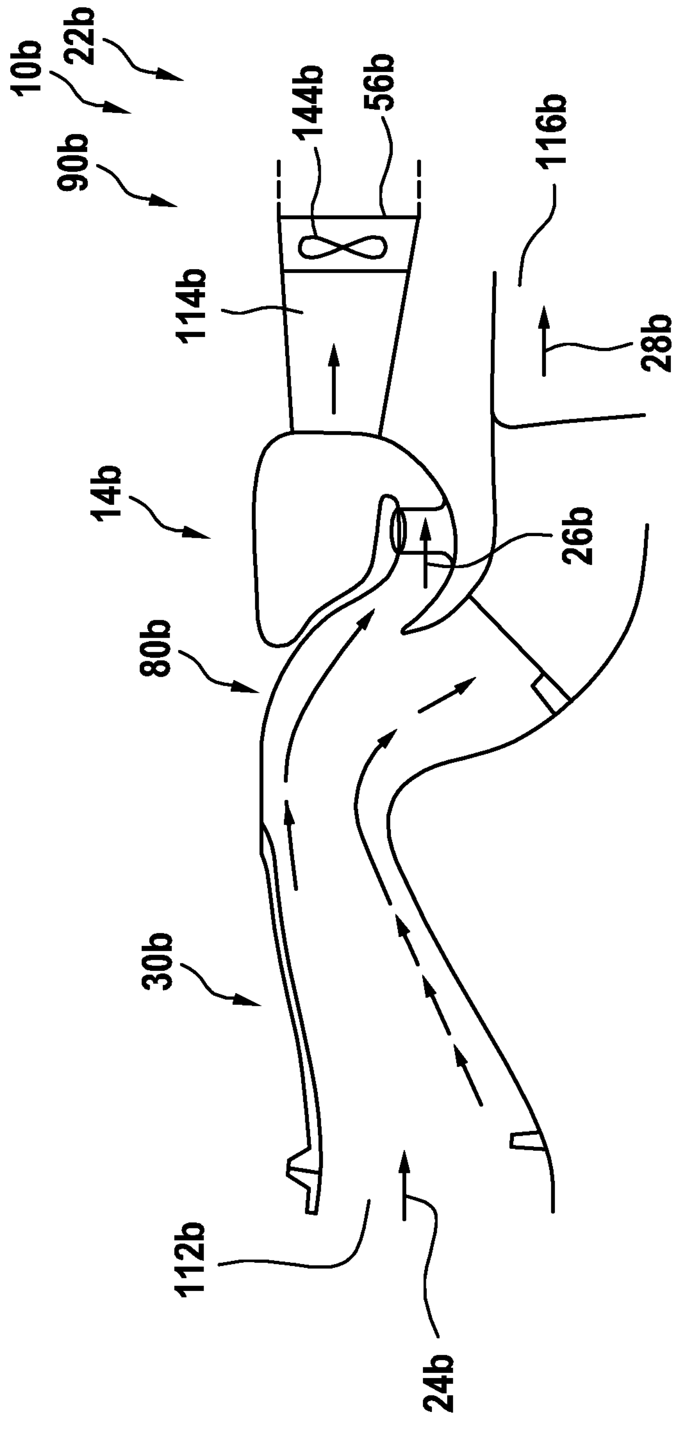
FIG. 6 shows a schematic representation of an alternative design of a separating unit of a power tool according to the disclosure.

FIG. 6 shows an alternative design of a separating unit 22*b*, in particular a separating element 80*b*, or a conveying unit 90*b* of a power tool 10*b*. The power tool 10*b* has a housing unit 14*b*, a drive unit 16*b*, arranged within the housing unit 14*b*, that in particular is not shown in FIG. 6, and the separating unit 22*b*, the separating unit 22*b* being designed to divide at least one fluid stream 24*b* conducted through the housing unit 14*b* into at least two sub-streams 26*b*, 28*b*, in particular in dependence on a foreign body density, one sub-stream 26*b* of the sub-streams 26*b*, 28*b* having a higher foreign body density in comparison with another sub-stream 28*c* of the sub-streams 26*b*, 28*b*. The power tool 10*b* has a fluid cooling unit 30*b*, which is designed to cool the drive unit 16*b* by means of the at least two sub-streams 26*b*, 28*b*. The power tool 10*b* represented in FIG. 6 is at least substantially similar in design to the power tool 10*a* described in the description of FIGS. 1 to 5, such that reference may be made at least substantially to the description of FIGS. 1 to 5 in respect of a design of the power tool 10*b* represented in FIG. 6. In contrast to the power tool 10*a* described in FIGS. 1 to 5, the separating unit 22*b* and/or the conveying unit 90*b* of the power tool 10*b* represented in FIG. 6 preferably has a further conveying element 144*b*. The further conveying element 144*b* is arranged at a fluid outlet 114*b* of the separating element 80*b* that is designed to conduct the fluid stream 24*b*. The further conveying element 144*b* is realized as a fan. The further conveying element 144*b* is designed to convey the sub-stream 26*b* into a channel element 56*b* of the fluid cooling unit 30*b* that is arranged along an outer wall 84*b* of the drive unit 16*b* that, in particular, is not shown in FIG. 6 and that is designed to cool the drive unit 16*b* via the sub-stream 26*b*. The further conveying element 144*b* is designed to draw foreign bodies in the fluid stream 24*b* into the sub-stream 26*b*, in particular with a foreign body density of the sub-stream 26*b* being increased and a foreign body density of the other sub-stream 28*b* being reduced. The further conveying element 144*b* is arranged, in particular fluidically, between the intake opening 34*b* of the fluid cooling unit 30*b* and the drive unit 16*b*. The further conveying element 144*b* is arranged at least largely within the fluid cooling unit 30*b*, in particular the channel element 56*b*. The further conveying element 144*b* is arranged, in particular fluidically, between the separating unit 22*b* and the drive unit 22*b*, or outlet openings 42*b*, 44*b*, 46*b*, of the fluid cooling unit 30*b*. It is also conceivable for the further conveying element 144*b* to be arranged between an intake opening 36*b* of the fluid cooling unit 30*b* and the separating element 80*b*.

The further conveying element 144*b* is designed to convey the sub-stream 26*b* and/or the other sub-stream 28*b* through the fluid cooling unit 30*b*, through the separating unit 22*b* and/or out of the power tool 10*b*, or out of the housing unit 14*b*. After flowing through, or past, the drive unit 16*b*, the sub-stream 26*b* and the other sub-stream 28*b* are guided together out of the power tool 10*b* through a plurality of outlet openings 42*b*, 44*b*, 46*b*. In particular, after flowing through, or past, the drive unit 16*b*, the sub-stream 26*b* and the other sub-stream 28*b* within the power tool 10*b*, in particular the housing unit 14*b*, are brought together in a channel element of the fluid cooling unit 30*b*. It is also conceivable, however, for the fluid cooling unit 30*b* to be realized in such a manner that the sub-stream 26*b* and the other sub-stream 28*b* are guided separately out of the power tool 10*b*.

Figure 7:
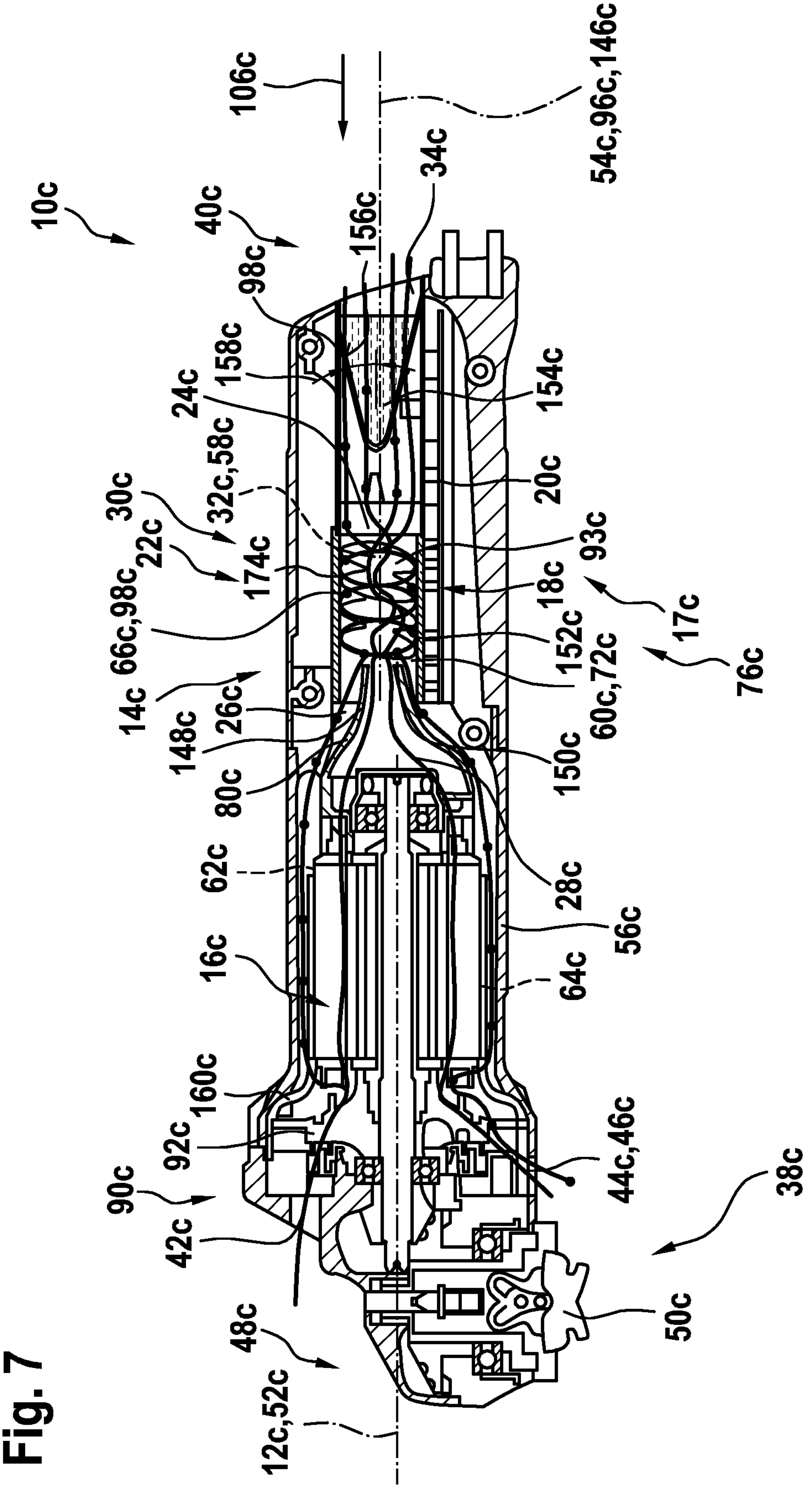
FIG. 7 shows a side view of a longitudinal section of an alternative design of a power tool according to the disclosure with an electronic device and a helical separating element of a separating unit of the power tool.

FIG. 7 shows an alternative design of a power tool 10*c*, in particular in a representation similar to FIG. 1. The power tool 10*c* has an electronic device 17*c*, a housing unit 14*c*, a drive unit 16*c* arranged within the housing unit 14*c*, and a separating unit 22*c*, the separating unit 22*c* being designed to divide at least one fluid stream 24*c* conducted through the housing unit 14*c* into at least two sub-streams 26*c*, 28*c*, in particular in dependence on a foreign body density, one sub-stream 26*c* of the sub-streams 26*c*, 28*c* having a higher foreign body density in comparison with another sub-stream 28*c* of the sub-streams 26*c*, 28*c*. The power tool 10*c* and/or the electronic device 17*c* has/have a fluid cooling unit 30*c*, which is designed to cool the drive unit 16*c* by means of the at least two sub-streams 26*c*, 28*c*. The power tool 10*c* and/or the electronic device 17*c* comprise/comprises an electronic unit 18*c*, the fluid cooling unit 30*c* being designed to cool the electronic unit 18*c* by means of a fluid, or the fluid stream 24*c*. The electronic unit 18*c* is arranged at least largely, in particular entirely, outside of a fluid flow path 32*c* of the fluid cooling unit 30*c*. The power tool 10*c*, in particular the separating unit 22*c*, has a conveying unit 90*c* for conveying the fluid through the fluid cooling unit 30*c*.

The power tool 10*c* represented in FIG. 7 is at least substantially similar in design to the power tool 10*a* described in the description of FIGS. 1 to 5, such that reference may be made at least substantially to the description of FIGS. 1 to 5 in respect of a design of the power tool 10*c* represented in FIG. 7. In contrast to the power tool 10*a* described in the description of FIGS. 1 to 5, the separating unit 22*c* of the power tool 10*c* represented in FIG. 7 preferably has a further separating element 93*c* that is arranged within a main channel element 98*c* of the fluid cooling unit 30*c* and is designed to conduct the fluid stream 24*c* onto a circular path 174*c* for the purpose of dividing the sub-streams 26*c*, 28*c*, as viewed along the main channel element 98*c*. The further separating element 93*c* is realized as a spiral shaped part. The further separating element 93*c* delimits, in particular within and/or together with the main channel element 98*c*, a fluid guiding channel that extends, from the intake opening 34*c* in the direction of the drive unit 16*c*, along a curve that runs with a constant gradient around a lateral surface of an imaginary cylinder. In particular, the curve realizes the circular path 174*c* in a plane of projection. The conveying unit 90*c* of the power tool 10*c* comprises a conveying element 92*c* that constitutes a single part with a fan of the drive unit 16*c*. The conveying element 92*c* is arranged behind the main channel element 98*c*, the further separating element 93*c* and the drive unit 16*c*, as viewed from an intake opening 34*c* of the fluid cooling unit 30*c*. The conveying element 92*c* is designed to draw the fluid stream 24*c* through the intake opening 34*c* into the power tool 10*c*, in particular the fluid cooling unit 30*c*. The conveying element 92*c* is designed to convey the fluid stream 24*c* through main channel element 98*c* and a fluid channel delimited by the main channel element 98*c* and the further separating element 93*c* and, in particular, after the separating unit 22*c* to convey the sub-stream 26*c* through the channel element 56*c*. A separating element 80*c* of the separating unit 22*c* and the fluid cooling unit 30*c* are realized in such a manner that the sub-stream 26*c* and the other sub-stream 28*c* are conducted separately from one another after exiting the further separating element 93*c*. The separating element 80*c* is realized as a funnel, in particular the other sub-stream 28*c* being conducted along a central axis 146*c* of the separating element 80*c* that in particular is arranged coaxially with a central axis of the further separating element 93*c* and of the main channel element 98*c*, and the sub-stream 28*c* being guided along an outer wall 148*c* of the separating element 80*c*. The separating element 80*c* is at least partially cone-shaped. The separating element 80*c* delimits at least one passage 150*c*, around the central axis 146*c*, that is designed in particular to conduct the other sub-stream 28*c*, in particular through, or into, the drive unit 16*c*. The conveying element 92*c* is designed to divide the fluid stream 24*c*, together with a separating element 80*c* of the separating unit 22*c*, into the sub-streams 26*c*, 28*c*, in particular the sub-stream 26*c* being at a greater radial distance from the central axis of the further separating element 93*c* and the main channel element 98*c* than the other sub-stream 28*c*. The further separating element 93*c* is at least largely surrounded by the main channel element 98*c*, as viewed along its central axis. The further separating element 98*c* is designed, in particular for the purpose of cooling the electronic unit 18*c*, to compress the fluid at an inner wall 152*c* of the fluid cooling element 66*c*, or of the main channel element 98*c*, that delimits a fluid channel 72*c*. The further separating element 98*c* is designed to increase a flow duration of the fluid, or of the fluid stream 24*c*, through the fluid cooling element 66*c*, or the main channel element 98*c*, in particular in comparison with a design in which the fluid cooling element 66*c*, or the main channel element 98*c*, is hollow, in particular without the further separating element 93*c*.

The separating unit 22*c* and the fluid cooling unit 30*c* respectively comprise a filter element 154*c* that is designed to alter, in particular to reduce, the foreign body density of the fluid stream 24*c*. The filter element 154*c* is arranged, in particular directly, at the intake opening 34*c* of the fluid cooling unit 30*c*. The filter element 154*c*, in particular a filter surface 156*c* of the filter element 154*c*, is arranged at least partially transversely to a direction of main extent 54*c* of the fluid cooling unit 30*c*. The filter surface 156*c* spans, with the direction of main extent 54*c* of the fluid cooling unit 30*c*, in a region of the filter element 154*c*, or of the intake opening 34*c*, an angle 158*c* having a value from a value range of, in particular, 8° to 82°, preferably 10° to 50° and particularly preferably 15° to 30°. The angle 158*c* spanned by the filter surface 156*c* and the direction of main extent 54*c* of the fluid cooling unit 30*c* is preferably at least substantially 18°. The filter element 154*c* is at least largely cone-shaped. Preferably, a low flow resistance of the filter element 154*c* in the fluid stream 24*c* can be achieved by the design of the filter element 154*c*. After flowing past the drive unit 16*c*, the fluid stream 24*c* is conveyed out of the power tool 10*c*, via a plurality of outlet openings 42*c*, 44*c*, 46*c* by means of the conveying element 92*c*. Alternatively, it is conceivable for the filter element 154*c* to be arranged on the separating element 80*c* and to be designed to filter, in particular to reduce, a foreign body density of the other sub-stream 28*c* before entry into the drive unit 16*c*. In particular, the sub-stream 26*c* and the other sub-stream 28*c*, after flowing through, or past, the drive unit 16*c*, are brought together within the power tool 10*c*, in particular the housing unit 14*c*, in a further channel element 160*c* of the fluid cooling unit 30*c*. It is also conceivable, however, for the fluid cooling unit 30*c* to be realized in such a manner that the sub-stream 26*c* and the other sub-stream 28*c* are conducted separately out of the power tool 10*c*.

It is conceivable for the conveying unit 90*c* to have a further conveying element, realized as a spiral wheel that in particular is not shown in FIG. 7, or for the further separating element 93*c* to be realized so as to be movable by means of a drive element of the drive unit 16*c*, in particular about its central axis. In particular, the drive element is designed to drive the further separating element 93*c* and thereby to convey the fluid stream 24*c* through the fluid cooling unit 30*c*, in particular the main channel element 98*c*.

Figure 8:
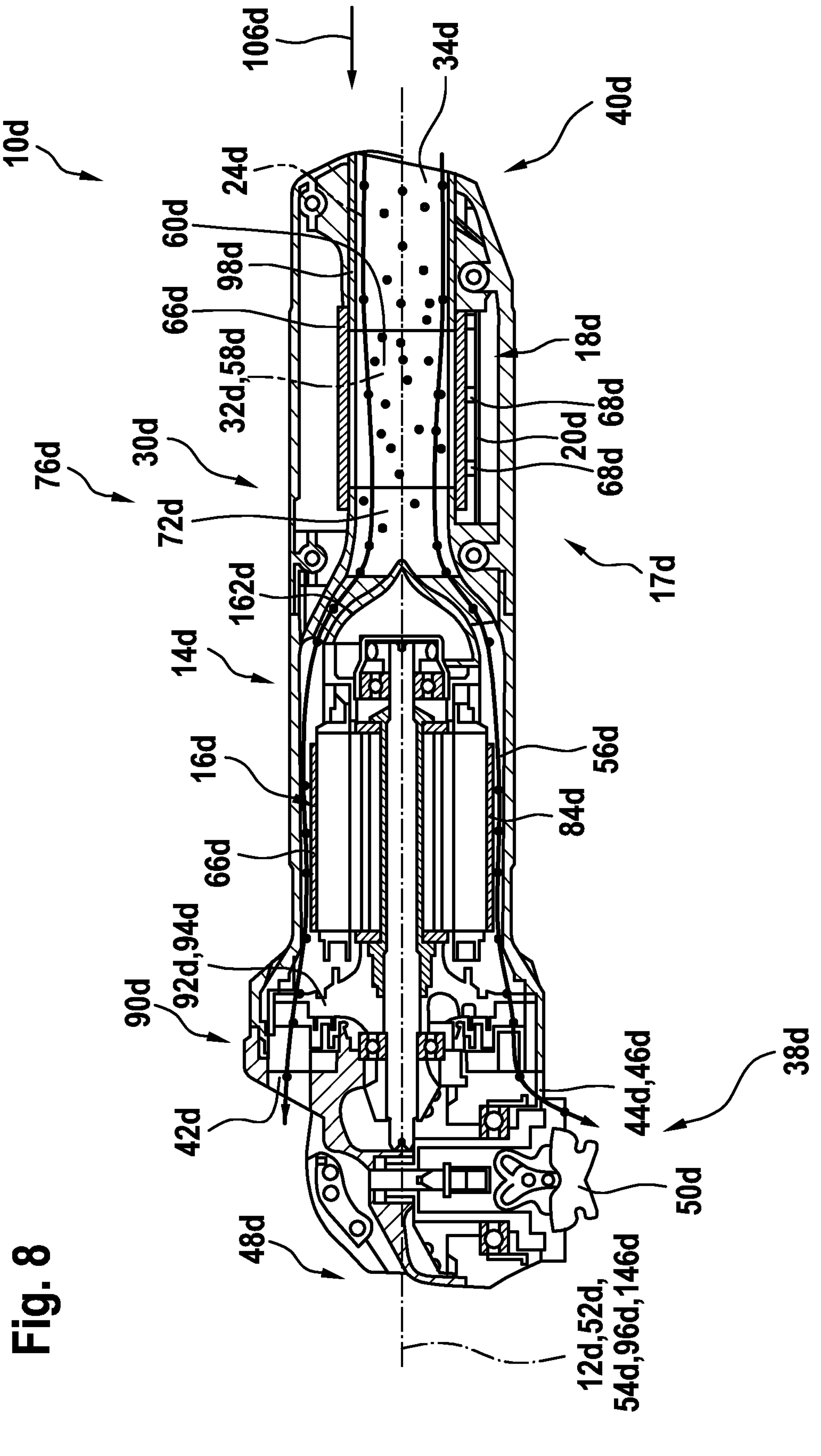
FIG. 8 shows a side view of a longitudinal section of a further alternative design of a power tool according to the disclosure with an electronic device.

FIG. 8 shows an alternative design of a power tool 10*d*, in particular in a representation similar to FIG. 1. The power tool 10*d* has an electronic device 17*d*, a housing unit 14*d*, and a drive unit 16*d* arranged within the housing unit 14*d*. The power tool 10*d* and/or the electronic device 17*d* has/have a fluid cooling unit 30*d*, which is designed to cool the drive unit 16*d* by means of the at least two sub-streams 26*d*, 28*d*. The power tool 10*d* and/or the electronic device 17*d* comprise/comprises an electronic unit 18*d*, the fluid cooling unit 30*d* being designed to cool the electronic unit 18*d* by means of a fluid, or the fluid stream 24*d*. The electronic unit 18*d* is arranged at least largely, in particular entirely, outside of a fluid flow path 32*d* of the fluid cooling unit 30*d*. The power tool 10*d* represented in FIG. 8 is at least substantially similar in design to the power tool 10*a* described in the description of FIGS. 1 to 5, such that reference may be made at least substantially to the description of FIGS. 1 to 5 in respect of a design of the power tool 10*d* represented in FIG. 8. In contrast to the power tool 10*a* described in the description of FIGS. 1 to 5, the power tool 10*d* represented in FIG. 8 preferably does not have a separating unit. The fluid cooling unit 30*d* is designed to cool the electronic unit 18*d* and the drive unit 16*d* by means of the aspirated fluid stream 24*d*, in particular the drive unit 16*d* being effected by the fluid stream 24*d* being guided along an outer wall 84*d* of the drive unit 16*d*. The fluid cooling unit 30*d* comprises a channel element 56*d* that guides the fluid stream 24*d* directly along and at least substantially parallel to the outer wall 84*d* of the drive unit 16*d*. The fluid stream 24*d* is conveyed through the power tool 10*d* via a conveying unit 90*d*. The conveying unit 90*d* comprises a conveying element 92*d* that is arranged, in particular fluidically, behind the drive unit 16*d*, as viewed from the intake opening 34*d*. The fluid cooling unit 30*d* comprises a fluid cooling element 66*d* that is designed to dissipate heat from the electronic unit 18*d* to the fluid stream 24*d*. The fluid cooling element 66*d* constitutes a single piece with a main channel element 98*d* of the fluid cooling unit 30*d*, in particular an entire drawn-in fluid stream 24*d* in a proximity region 76*d* of the electronic unit 18*d* running through the main channel element 98*d* and the fluid cooling element 66*d*. The fluid cooling unit 30*d* comprises a deflector element 162*d*, which is in particular at least substantially conical. The deflector element 162*d* is streamlined. The deflector element 162*d* is designed to guide the fluid stream 24*d* from the main channel element 98*d* into the channel element 56*d*, in particular the fluid stream 24*d* being guided radially outward from a central axis 146*d* of the main channel element 98*d*.

Figure 9:
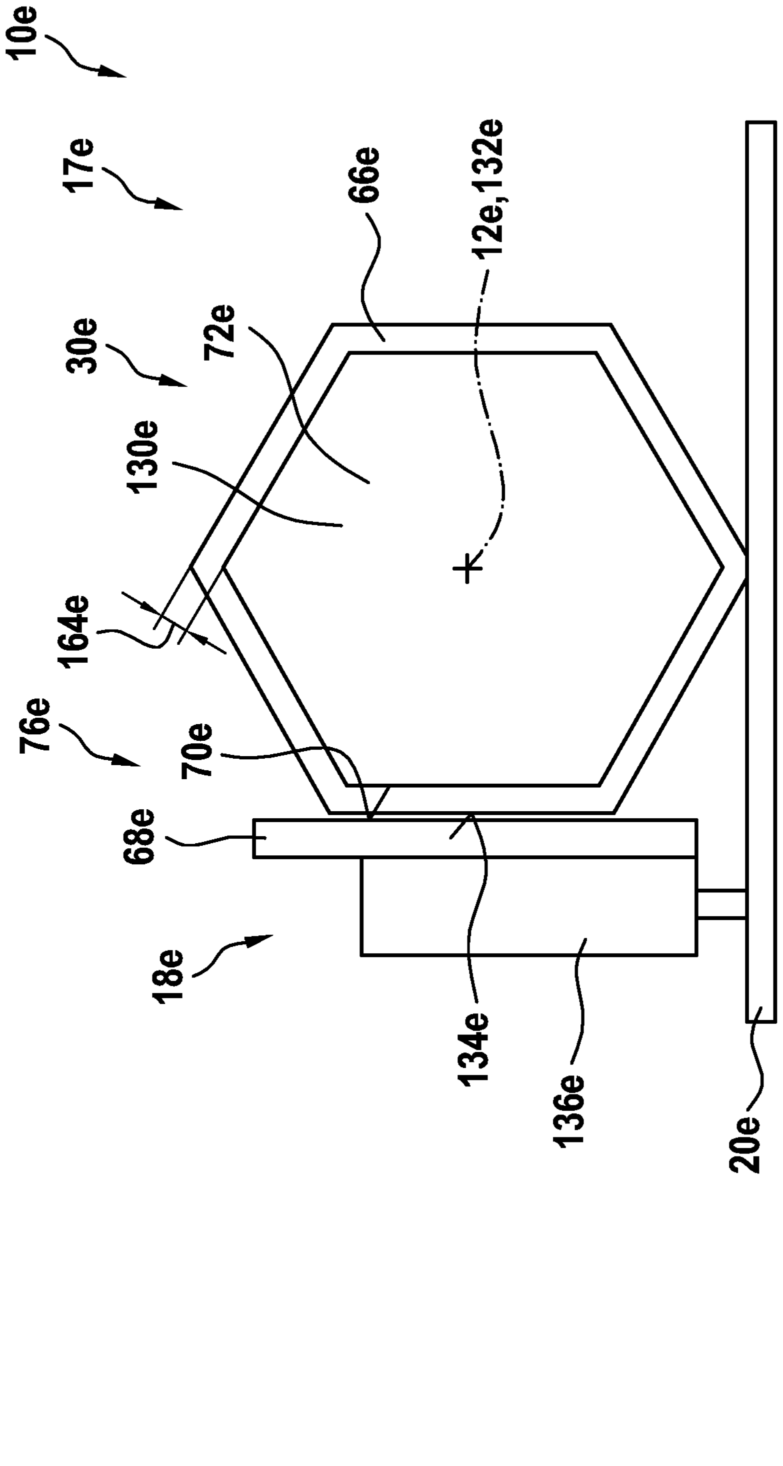
FIG. 9 shows a schematic representation of a cross-section of an alternative design of an electronic device of the power tool according to the disclosure with an angular fluid channel.

FIG. 9 shows an alternative design of a fluid cooling element 66*e* of a fluid cooling unit 30*e* of a power tool 10*e*, or of an electronic device 17*e*. The power tool 10*e*, or electronic device 17*e*, represented in FIG. 9 is at least substantially similar in design to the power tool 10*a*, or electronic device 17*a*, described in the description of FIGS. 1 to 5, such that reference may be made at least substantially to the description of FIGS. 1 to 5 in respect of a design of the power tool 10*e*, or electronic device 17*e*, represented in FIG. 9. In contrast to the power tool 10*a*, or electronic device 17*a*, described in FIGS. 1 to 5, the fluid cooling element 66*e* of the fluid cooling unit 30*e* of the power tool 10*e*, or electronic device 17*e*, represented in FIG. 9 preferably delimits a fluid channel 72*e* that has an angular cross-sectional area 130*e*. The cross-sectional area 130*e* of the fluid channel 72*e* delimited by the fluid cooling element 66*e* is hexagonal. A minimum wall thickness 164*e* of the fluid cooling element 66*e* is in particular at least 0.5 mm, preferably at least 1 mm, more preferably at least 1.5 mm, and particularly preferably at least 2 mm, and/or in particular at most 10 mm, preferably at most 6 mm, and more preferably at most 4 mm. Preferably, a maximum value of the cross-sectional area 130*e* of the fluid channel 72*e* delimited by the fluid cooling element 66*e* is at least 100 $mm^2$, preferably at least 200 $mm^2$, more preferably at least 400 $mm^2$, and more preferably at least 600 $mm^2$. In particular, an electronic unit 18*e* of the power tool 10*e* is realized without a sealing unit. However, other designs of the fluid cooling unit 30*e* and/or of the electronic unit 18*e* are also conceivable.

Figure 10:
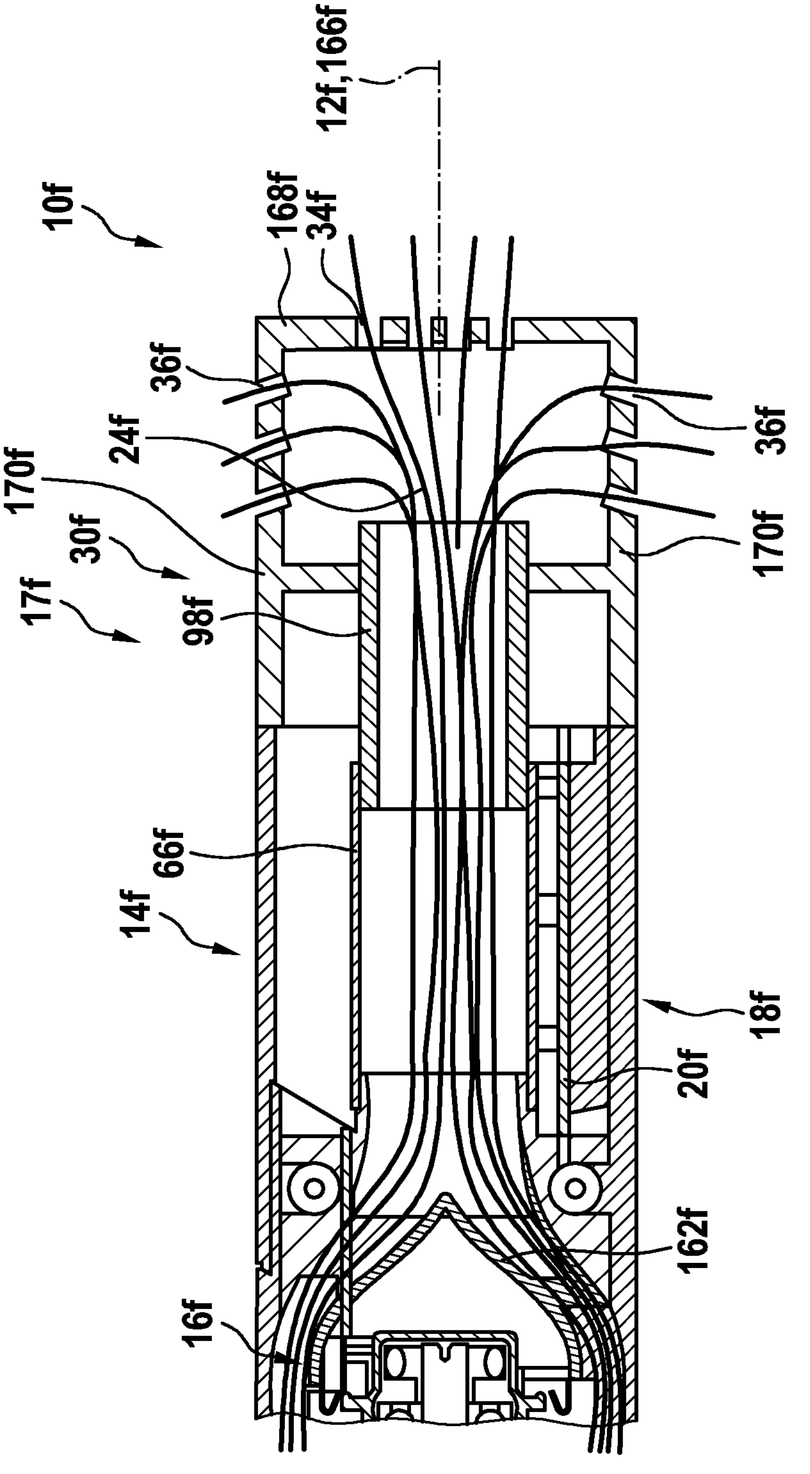
FIG. 10 shows a side view of a longitudinal section of another alternative design of a power tool according to the disclosure with an electronic device and a fluid cooling unit having a plurality of inlet openings.

FIG. 10 shows another alternative design of a power tool 10*f*, or of an electronic device 17*f*, the power tool 10*g* being shown in a longitudinal section similar to FIG. 1. The power tool 10*f* represented in FIG. 10 is at least substantially similar in design to the power tool 10*d* described in the description of FIG. 8, such that reference may be made at least substantially to the description of FIG. 8 in respect of a design of the power tool 10*f* represented in FIG. 10. In contrast to the power tool 10*d* described in the description of FIG. 8, a housing unit 14*f* of the power tool 10*f* represented in FIG. 10 delimits more than one intake opening 34*f*, 36*f* for drawing in a fluid, or a fluid stream 24*f*, for cooling an electronic unit 18*f* and a drive unit 16*f* by means of a fluid cooling unit 30*f*. The intake openings 34*f*, 36*f* are designed to conduct fluid, or the fluid stream 24*f*, into a main channel element 98*f* of the fluid cooling unit 30*f*. The housing unit 14*f* and/or the fluid cooling unit 30*f* delimit/delimits ten intake openings 34*f*, 36*f*, four intake openings 34*f* of the ten intake openings 34*f*, 36*f* being arranged on an outer wall 168*f* of the power tool 10*f*, in particular of the housing unit 14*f*, that is oriented at least substantially perpendicularly to a central axis 166*f* of the main channel element 98*f*, or to a longitudinal axis 12*f* of the power tool 10*f*. Three intake openings 36*f* of the ten intake openings 34*f*, 36*f* are in each case arranged on outer walls 170*f* of the power tool 10*f*, in particular of the housing unit 14*f*, that face away from each other and in particular are oriented at least substantially parallel to the central axis 166*f* of the main channel element 98*f*, or to the longitudinal axis 12*f* of the power tool 10*f*. The ten intake openings 34*f*, 36*f* are designed to receive the fluid, or fluid stream 24*f*, on a side of the power tool 10*f* that faces away from a working region 38*f* of the power tool 10*f*, and to combine it in the main channel element 98*f*, in particular before it flows through a fluid cooling element 66*f* of the fluid cooling unit 30*f*. However, other designs of the housing unit 14*f* and/or the fluid cooling unit 30*f* are also conceivable, in particular with a number of intake openings 34*f*, 36*f* other than ten. It is conceivable for there to be a filter element attached to the intake openings 34*f*, 36*f*, in particular to each respectively, in order to reduce a foreign body density of the aspirated fluid stream 24*f*.

Figure 11:
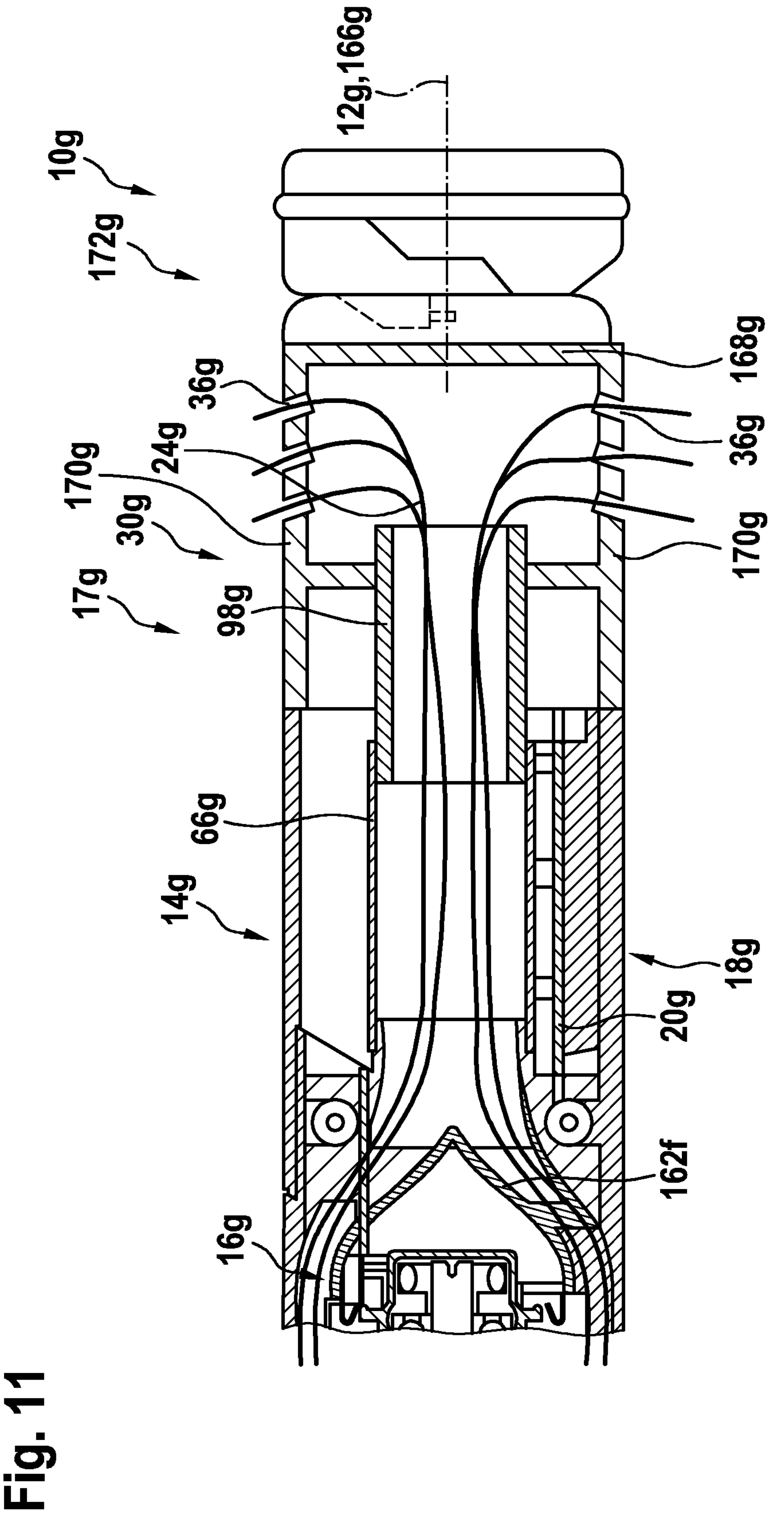
FIG. 11 shows a side view of a longitudinal section of a further, other alternative design of a power tool according to the disclosure with an electronic device and a fluid cooling unit having a plurality of lateral inlet openings.

FIG. 11 shows another, further alternative design of a power tool 10*g*, or of an electronic device 17*g*, the power tool 10*g* being shown in a longitudinal section similar to FIG. 1. The power tool 10*g* represented in FIG. 11 is at least substantially similar in design to the power tool 10*d* described in the description of FIG. 8, such that reference may be made at least substantially to the description of FIG. 8 in respect of a design of the power tool 10*g* represented in FIG. 11. In contrast to the power tool 10*d* described in the description of FIG. 8, a housing unit 14*g* of the power tool 10*g* represented in FIG. 11 delimits more than one intake opening 36*g* for drawing in a fluid, or a fluid stream 24*g*, for cooling an electronic unit 18*g* and a drive unit 16*g* by means of a fluid cooling unit 30*g*. The intake openings 36*g* are designed to guide fluid, or the fluid stream 24*g*, into a main channel element 98*g* of the fluid cooling unit 30*g*. The housing unit 14*g* and/or the fluid cooling unit 30*g* delimit/delimits six intake openings 36*g*, respectively three intake openings 36*g* of the six intake openings 36*g* being arranged on outer walls 170*g* of the power tool 10*g*, in particular of the housing unit 14*g*, that face away from each other and in particular are oriented at least substantially parallel to a central axis 166*g* of the main channel element 98*g*, or to a longitudinal axis 12*g* of the power tool 10*g*. The six intake openings 36*g* are designed to receive the fluid, or fluid stream 24*g*, on a side of the power tool 10*g* that faces away from a working region 38*g* of the power tool 10*g*, and to combine it in the main channel element 98*g*, in particular before it flows through a fluid cooling element 66*g* of the fluid cooling unit 30*g*. The power tool 10*g* is realized as a battery-operated power tool. There is a battery pack 172*g* attached to an outer wall 168*g* of the power tool 10*g*, in particular of the housing unit 14*g*, that is oriented at least substantially perpendicularly to the central axis 166*g* of the main channel element 98*g*, or to the longitudinal axis 12*g* of the power tool 10*g*. The intake openings 36*g* face away from the battery pack 172*g*. However, other designs of the housing unit 14*g* and/or the fluid cooling unit 30*g* are also conceivable, in particular with a number of intake openings 36*g* other than six.

The invention claimed is:

1. A power tool, comprising:

at least one housing unit;

at least one drive unit arranged within the housing unit;

at least one separating unit that is configured to divide at least one fluid stream conducted through the housing unit into at least two sub-streams in dependence on a foreign body density, wherein one sub-stream of the at least two sub-streams has a higher foreign body density in comparison with another sub-stream of the at least two sub-streams; and at least one fluid cooling unit that is configured to cool the drive unit with the at least two sub-streams, wherein the at least one separating element includes a helical part.

2. The power tool as claimed in claim 1, wherein the at least one separating unit comprises at least one separating element arranged in a proximity region of the drive unit and configured to divide the at least one fluid stream.

3. The power tool claimed in claim 2, wherein:

the at least one fluid cooling unit comprises at least one main channel element configured to conduct the at least one fluid stream, the at least one main channel element is arranged in front of the at least one drive unit as viewed along a direction of main extent of the at least one fluid cooling unit, and the at least one separating element is arranged within the at least one main channel element and/or within a region of the at least one fluid cooling unit delimited by the at least one main channel element.

4. The power tool as claimed in claim 2, wherein the at least one separating element includes a channel element arranged in the proximity region of the at least one drive unit.

5. The power tool as claimed in claim 1, wherein the at least one fluid cooling unit comprises at least one channel element which is configured to guide the one sub-stream separately from the other sub-stream at least partially past an outer wall of the drive unit.

6. The power tool as claimed in claim 1, wherein the at least one separating unit comprises at least one conveying unit which is arranged within the at least one fluid cooling unit and is configured to convey at least the one sub-stream out of or through the at least one housing unit.

7. The power tool as claimed in claim 6, wherein the at least one conveying unit comprises at least one conveying element which includes an axial fan.

8. The power tool as claimed in claim 6, wherein the at least one conveying unit is configured to convey the one sub-stream and the other sub-stream separately from each other through the at least one housing unit and/or the at least one fluid cooling unit.

9. The power tool as claimed in claim 1, wherein the at least one separating unit comprises at least one separating element that is arranged within a channel element of the at least one fluid cooling unit and that is configured to conduct the fluid stream onto a circular path so as to divide the one sub-stream and the other sub-stream as viewed along the channel element.

10. The power tool as claimed in claim 1, wherein the at least one separating unit and/or the at least one fluid cooling unit comprises at least one filter element that is configured to alter the foreign body density of the fluid stream.

11. A process for cooling at least one drive unit of a power tool as claimed in claim 1, comprising providing a fluid stream to said at least one separating unit so that said at least two sub-streams are used by said at least one cooling unit to cool said drive unit.

12. The power tool as claimed in claim 1, wherein the power tool is a hand-held power tool.

13. A power tool, comprising:

at least one housing unit;

at least one drive unit arranged within the housing unit;

at least one separating unit that is configured to divide at least one fluid stream conducted through the housing unit into at least two sub-streams in dependence on a foreign body density, wherein one sub-stream of the at least two sub-streams has a higher foreign body density in comparison with another sub-stream of the at least two sub-streams; and at least one fluid cooling unit that is configured to cool the drive unit with the at least two sub-streams, wherein the at least one separating element includes a spiral-shaped part that delimits a fluid guiding channel along a curve that runs with a constant gradient around a lateral surface of an imaginary cylinder defined around an axis extending through said at least one fluid stream.

14. The power tool as claimed in claim 13, wherein the at least one fluid cooling unit comprises at least one channel element which is configured to guide the one sub-stream separately from the other sub-stream at least partially past an outer wall of the drive unit.

15. The power tool as claimed in claim 13, wherein the at least one separating unit comprises an axial fan which is arranged within the at least one fluid cooling unit and is configured to convey at least the one sub-stream out of or through the at least one housing unit.

16. The power tool as claimed in claim 13, wherein the at least one separating unit comprises at least one separating element that is arranged within a channel element of the at least one fluid cooling unit and that is configured to conduct the fluid stream onto a circular path so as to divide the one sub-stream and the other sub-stream as viewed along the channel element.

17. The power tool as claimed in claim 13, wherein the at least one separating unit and/or the at least one fluid cooling unit comprises at least one filter element that is configured to alter the foreign body density of the fluid stream.

18. The power tool as claimed in claim 13, wherein the at least one separating unit comprises at least one separating element arranged in a proximity region of the drive unit and configured to divide the at least one fluid stream.

19. The power tool claimed in claim 18, wherein:

the at least one fluid cooling unit comprises at least one main channel element configured to conduct the at least one fluid stream, the at least one main channel element is arranged in front of the at least one drive unit as viewed along a direction of main extent of the at least one fluid cooling unit, and the at least one separating element is arranged within the at least one main channel element and/or within a region of the at least one fluid cooling unit delimited by the at least one main channel element.

20. The power tool as claimed in claim 18, wherein the at least one separating element includes a channel element arranged in the proximity region of the at least one drive unit.

* * * * *